US012235379B2

(12) United States Patent
Lee et al.

(10) Patent No.: US 12,235,379 B2
(45) Date of Patent: Feb. 25, 2025

(54) ELECTRONIC DEVICE AND METHOD FOR DETECTING EXTERNAL OBJECT BY USING ANTENNA ARRAY

(71) Applicant: Samsung Electronics Co., Ltd., Suwon-si (KR)

(72) Inventors: Kyungrok Lee, Suwon-si (KR); Minhong Do, Suwon-si (KR); Seongjin Park, Suwon-si (KR); Seokwoo Lee, Suwon-si (KR); Sukchan Hong, Suwon-si (KR); Jaebong Chun, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 17/574,397

(22) Filed: Jan. 12, 2022

(65) Prior Publication Data

US 2022/0137180 A1 May 5, 2022

Related U.S. Application Data

(63) Continuation of application No. PCT/KR2020/009131, filed on Jul. 10, 2020.

(30) Foreign Application Priority Data

Jul. 12, 2019 (KR) .................. 10-2019-0084243

(51) Int. Cl.
*G01S 7/03* (2006.01)
*G01S 7/02* (2006.01)
(Continued)

(52) U.S. Cl.
CPC ............... *G01S 7/03* (2013.01); *G01S 7/024* (2013.01); *G01S 7/411* (2013.01); *G01S 13/86* (2013.01); *H04B 7/0404* (2013.01); *H01Q 3/24* (2013.01)

(58) Field of Classification Search
CPC . G01S 7/03; G01S 7/024; G01S 13/86; H04B 7/0404; H01Q 3/24
See application file for complete search history.

(56) References Cited

U.S. PATENT DOCUMENTS 9,608,683 B2 3/2017 Kawasaki
9,843,111 B2 * 12/2017 Ying .................. H01Q 21/0075
(Continued)

FOREIGN PATENT DOCUMENTS

JP 2011-109440 A 6/2011
KR 10-2016-0149021 A 12/2016
(Continued)

OTHER PUBLICATIONS

International Search Report dated Oct. 28, 2020 in connection with International Patent Application No. PCT/KR2020/009131, 3 pages.
(Continued)

*Primary Examiner* — Marcus E Windrich

(57) ABSTRACT

An electronic device according to various embodiments of the present disclosure may include a plurality of antenna arrays and at least one processor operatively connected to the plurality of antenna arrays. The at least one processor may transmit a first radio signal including a specific polarization, generated through a first antenna array of the plurality of antenna arrays. The at least one processor may receive a second radio signal which is a reflected signal of the first radio signal and includes the specific polarization, generated through a second antenna array different from the first antenna array of the plurality of antenna arrays. The at least one processor may identify external objects around the
(Continued)

electronic device on the basis of the second radio signal. Other various embodiments may be possible.

20 Claims, 21 Drawing Sheets

(51) Int. Cl.
*G01S 7/41* (2006.01)
*G01S 13/86* (2006.01)
*H04B 7/0404* (2017.01)
*H01Q 3/24* (2006.01)

(56) References Cited

U.S. PATENT DOCUMENTS

| | | | |
|---|---|---|---|
| 10,084,241 B1* | 9/2018 | Jenwatanavet | H01Q 1/48 |
| 2009/0143038 A1* | 6/2009 | Saito | H01Q 21/28 |
| | | | 455/272 |
| 2011/0116404 A1 | 5/2011 | Shimizu | |
| 2013/0257668 A1* | 10/2013 | Rao | H01Q 21/28 |
| | | | 343/893 |
| 2014/0099992 A1* | 4/2014 | Burns | G06F 3/04883 |
| | | | 455/550.1 |
| 2014/0128032 A1* | 5/2014 | Muthukumar | H04W 52/0254 |
| | | | 455/412.2 |
| 2016/0372832 A1 | 12/2016 | Park et al. | |
| 2017/0086202 A1 | 3/2017 | Chen | |
| 2018/0348353 A1 | 12/2018 | Lien et al. | |
| 2019/0006751 A1* | 1/2019 | Chen | H04B 7/10 |
| 2020/0166623 A1 | 5/2020 | Sahin et al. | |
| 2020/0271751 A1* | 8/2020 | Mayer | G01S 7/411 |

FOREIGN PATENT DOCUMENTS

| | | |
|---|---|---|
| KR | 10-1872016 B1 | 7/2018 |
| KR | 10-1903787 B1 | 10/2018 |
| KR | 10-2019-0001741 A | 1/2019 |
| KR | 10-1937820 B1 | 1/2019 |
| WO | 2019/120672 A1 | 6/2019 |

OTHER PUBLICATIONS

Written Opinion of the International Searching Authority dated Oct. 28, 2020 in connection with International Patent Application No. PCT/KR2020/009131, 5 pages.
Notice of Preliminary Rejection dated Oct. 24, 2023, in connection with Korean Application No. 10-2019-0084243, 9 pages.
Notice of Patent Grant dated Jun. 15, 2024, in connection with Korean Application No. 10-2019-0084243, 5 pages.

* cited by examiner

ELECTRONIC DEVICE AND METHOD FOR DETECTING EXTERNAL OBJECT BY USING ANTENNA ARRAY

CROSS-REFERENCE TO RELATED APPLICATIONS

This application is a continuation of International Application No. PCT/KR2020/009131 filed on Jul. 10, 2020, which claims priority to Korean Patent Application No. 10-2019-0084243 filed on Jul. 12, 2019, the disclosures of which are herein incorporated by reference in their entirety.

BACKGROUND

1. Field

Various embodiments relate to an electronic device for detecting an external object by using one or more antenna arrays, and a method thereof.

2. Description of Related Art

With the recent development of digital technology, various types of electronic devices such as mobile communication terminals, smart phones, tablet personal computers (PC), electronic notebooks, personal digital assistants, or wearable devices are being widely used.

To meet a demand for wireless data traffic that is increasing after the commercialization of a 4th-generation (4G) communication system, efforts are being made to develop a 5th-generation (5G) communication system or a pre-5G communication system. For this reason, the 5G communication system or the pre-5G communication system is called a beyond 4G Network communication system or a post long term evolution (LTE) system.

To achieve a high data rate, the implementation of the 5G communication system in a high frequency (mmWave) band (e.g., such as a 60 GHz band) is being considered. To alleviate a path loss of radio waves in a high frequency band and increase a propagation distance of radio waves, beamforming, massive MIMO, Full Dimensional MIMO (FD-MIMO), array antenna, analog beam-forming, and large scale antenna technologies are under discussion in the 5G communication system.

It may be difficult to detect an external object in a range larger than a range in which an illuminance sensor and/or a grip sensor may detect the external object, in order to make an electromagnetic wave emitted in a specified direction and/or angle based on beamforming reach another electronic device (e.g., a base station) without being blocked and/or reflected by the external object.

When it is intended to sense an external object by using a mmWave band signal, in case that the external object is in a close position, if a signal is transmitted in the same direction and a reflected signal is received in the same direction, a reception quality may be deteriorated, because many signals are received by a reception module due to a leakage of the transmitted signal compared to a signal reflected and returned.

Even when transmitting or receiving a sensor signal by the same beam by using two transmission and reception modules disposed in the same direction, a reception quality may be deteriorated due to a leakage of a transmitted signal.

Various embodiments may provide a method and device for preventing or decreasing the degradation of reception performance caused by a leakage which occurs when a mmWave band signal is used for a proximity sensor function.

The technical problems to be achieved in the present document are not limited to the above-mentioned technical problems, and other technical problems not mentioned will be able to be clearly understood by those having an ordinary skill in the art to which the present disclosure belongs from the description below.

SUMMARY

An electronic device of various embodiments may include a plurality of antenna arrays, and at least one processor operatively connected to the plurality of antenna arrays. The at least one processor may transmit a first radio signal having a specified polarized wave through a first antenna array among the plurality of antenna arrays, receive a second radio signal that is a reflected signal of the first radio signal and has the specified polarized wave, through a second antenna array different from the first antenna array among the plurality of antenna arrays, and identify an external object around the electronic device, based on the second radio signal.

A method of an electronic device of various embodiments may include transmitting a first radio signal having a specified polarized wave through a first antenna array among a plurality of antenna arrays of the electronic device, receiving a second radio signal which is a reflected signal of the first radio signal and has the specified polarized wave, through a second antenna array different from the first antenna array among the plurality of antenna arrays, and identifying an external object around the electronic device based on the second radio signal.

An electronic device of various embodiments and a method thereof may detect an external object in a range larger than a range in which an illuminance sensor and/or a grip sensor may detect the external object, using an electromagnetic wave propagated in a specified direction and/or angle.

Effects obtainable in the present disclosure are not limited to the above-mentioned effects, and other effects not mentioned will be able to be clearly understood by those having an ordinary skill in the art to which the present disclosure belongs from the description below.

DETAILED DESCRIPTION

Figure 1:
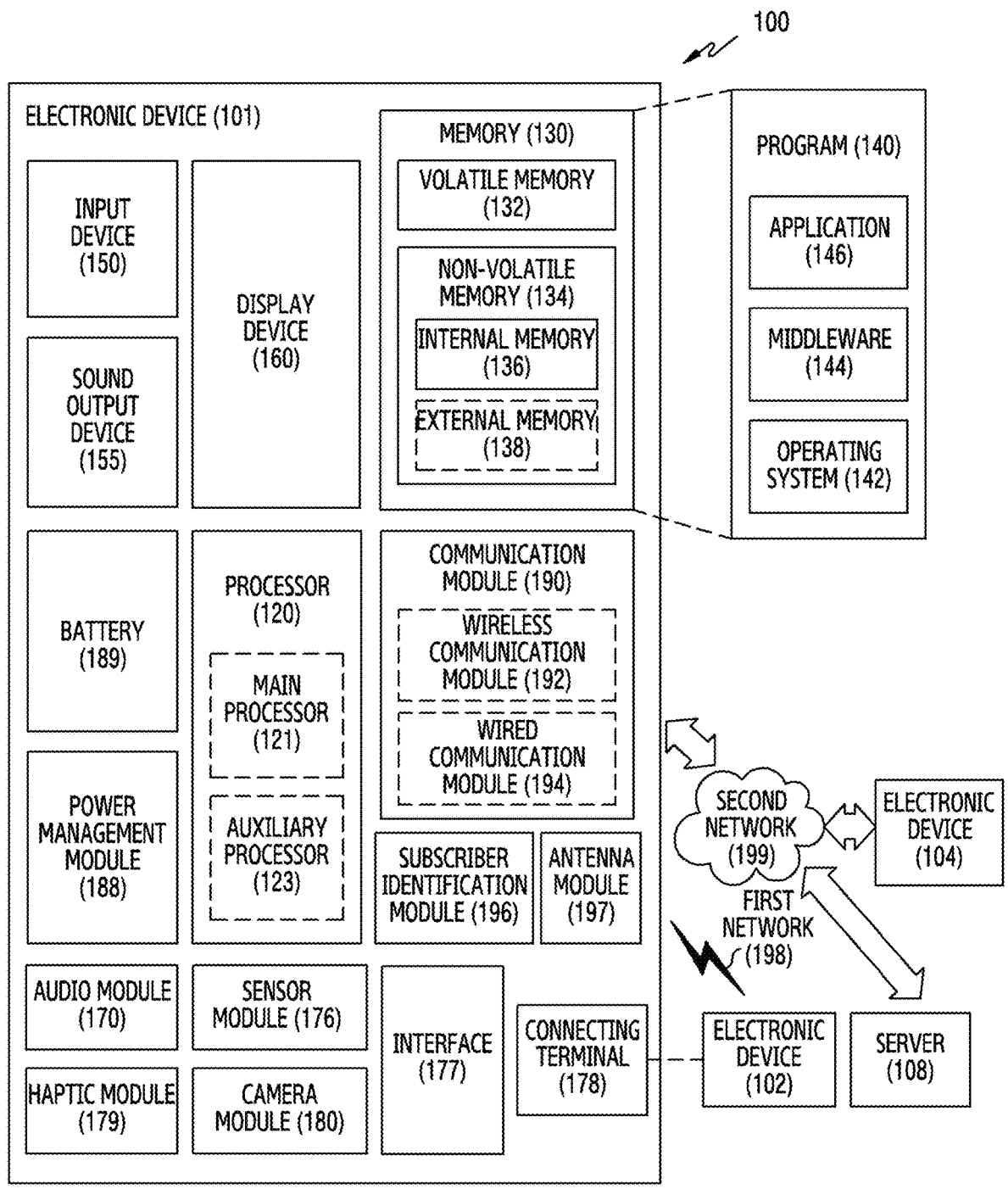
FIG. 1 illustrates a block diagram of an electronic device in a network environment according to various embodiments of the present disclosure.

Hereinafter, various embodiments of the present document will be described with reference to the accompanying drawings. However, this do not intend to limit the technology mentioned in the present document to a specific embodiment form, and it should be understood to include various modifications, equivalents and/or alternatives of an embodiment of the present document. In relation to a description of the drawing, like reference symbols may be used for like components.

In the present document, the expressions "have," "may have," "comprise," "may comprise," etc. indicate the existence of a corresponding feature (e.g., a constituent element such as a numerical value, a function, an operation, a part or the like), and do not exclude the existence of an additional feature.

In the present document, the expression "A or B," "at least one of A or/and B," "one or more of A or/and B" or the like may include all available combinations of items enumerated together. For example, "A or B," "at least one of A and B" or "at least one of A or B" may denote all (1) including at least one A, (2) including at least one B, or (3) including all of at least one A and at least one B.

The expression "first," "second," "firstly," "secondly" or the like may modify various constituent elements irrespective of order and/or importance, and are nothing but used to distinguish a constituent element from another constituent element and do not limit the corresponding constituent elements. For example, a first user device and a second user device may represent mutually different user devices, regardless of order or importance. For example, a first constituent element may be named a second constituent element without departing from the scope of right mentioned in the present document. Likely, even a second constituent element may be named interchangeably with a first constituent element.

When it is mentioned that some constituent element (e.g., a first constituent element) is "(operatively or communicatively) coupled with/to" or is "connected to" another constituent element (e.g., a second constituent element), it should be understood that some constituent element may be directly coupled to another constituent element, or be coupled to the another constituent element through a further constituent element (e.g., a third constituent element). On the other hand, when it is mentioned that some constituent element (e.g., a first constituent element) is "directly coupled to" or is "directly connected to" another constituent element (e.g., a second constituent element), it may be understood that a further constituent element (e.g., a third constituent element) does not exist between some constituent element and another constituent element.

The expression "configured (or set) to~" used in the present document may be used interchangeably with, for example, "suitable for~," "having the capacity to~," "designed to~," "adapted to~," "made to~," or "capable of~" according to context. The term "configured (or set) to~" may not necessarily mean only "specifically designed to" in hardware. Instead, in some context, the expression "device configured to~" may mean that the device is "capable of ~" together with other devices or parts. For example, the phrase "processor configured (or set) to perform A, B, and C" may mean an exclusive processor (e.g., an embedded processor) for performing a corresponding operation, or a generic-purpose processor (e.g., a central processing unit (CPU) or an application processor (AP)) capable of performing corresponding operations by executing one or more software programs stored in a memory device.

The terms used in the present document are terms used to just explain a specific embodiment, and may not intend to limit the scope of another embodiment. The expression of a singular form may include the expression of a plural form unless otherwise dictating clearly in context. The terms used herein inclusive of technological or scientific terms may have the same meaning as those commonly understood by a person having ordinary skill in the art mentioned in the present document. Among the terms used in the present document, the terms defined in a general dictionary may be interpreted as having the same or similar meanings to the contextual meanings of a related technology, and are not interpreted as having ideal or excessively formal meanings unless defined clearly in the present document. According to cases, even the terms defined in the present document may not be interpreted to exclude embodiments of the present document.

An electronic device of various embodiments of the present document may, for example, include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera or a wearable device. According to various embodiments of the present disclosure, the wearable device may include at least one of an accessory type (e.g., a watch, a ring, a wristlet, an anklet, a necklace, glasses, a contact lens, a head-mounted-device (HMD) or the like), a fabric or clothing integrated type (e.g., electronic clothes), a body mount type (e.g., a skin pad or tattoo) or a bio-implant type (e.g., an implantable circuit).

In some embodiments, the electronic device may be a home appliance. The home appliance may, for example, include at least one of a television, a digital video disk (DVD) player, an audio system, a refrigerator, an air conditioner, a cleaner, an oven, a microwave, a washing machine, an air cleaner, a set-top box, a home automation control panel, a security control panel, a TV box (e.g., Samsung HomeSync™, Apple TV™ or Google TV™), a game console (e.g., Xbox™, PlayStation™), an electronic dictionary, an electronic locking system, a camcorder, or an electronic frame.

In another embodiment, the electronic device may include at least one of various medical devices (e.g., various portable medical measuring devices (i.e., a blood sugar measuring device, a heart rate measuring device, a blood pressure measuring device, a body temperature measuring device or the like), magnetic resonance angiography (MRA), magnetic resonance imaging (MRI), computerized tomography (CT), a photographing machine, an ultrasonic machine or the like), a navigation device, a global navigation satellite system (GNSS), an event data recorder (EDR), a flight data recorder (FDR), a car infotainment device, an electronic equipment for ship (e.g., a navigation device for ship, a gyrocompass, etc.), avionics, a security device, a head unit for car, an industrial or home robot, an automatic teller's machine (ATM) of a financial institution, a point of sales (POS) of a shop or an Internet of things (IoT) device (e.g., an electric bulb, various sensors, an electricity or gas meter, a sprinkler device, a fire alarm, a thermostat, a streetlight, a toaster, an exerciser, a hot water tank, a heater, a boiler, etc.).

According to some embodiment, the electronic device may include at least one of a part of furniture or building/structure, an electronic board, an electronic signature receiving device, a projector or various metering devices (e.g., a tap water, electricity, gas or radio wave metering device, etc.). In various embodiments, the electronic device may be a combination of one or more of the aforementioned various devices. The electronic device of some embodiment may be a flexible electronic device or a foldable electronic device. Also, the electronic device of an embodiment of the present document is not limited to the aforementioned devices, and may include a new electronic device following the development of technology.

In the present document, the term 'user' may denote a person who uses the electronic device or a device (e.g., an artificial-intelligence electronic device) which uses the electronic device.

Various embodiments are described below with reference to the accompanying drawings. However, the sizes of constituent elements in the drawings may be exaggerated or reduced for description convenience's sake. For instance, a size and thickness of each constituent element shown in the drawings are arbitrarily shown for description convenience's sake and therefore, the present disclosure is not necessarily limited to the illustrated drawings.

FIG. 1 is a block diagram illustrating an electronic device 101 in a network environment 100 according to various embodiments of the present disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 may perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments of the present disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments of the present disclosure, one or more of the above-described components may be omitted, or one or more other components may be added. Alternatively or additionally, a plurality of components (e.g., modules or programs) may be integrated into a single component. In such a case, according to various embodiments of the present disclosure, the integrated component may still perform one or more functions of each of the plurality of components in the same or similar manner as they are performed by a corresponding one of the plurality of components before the integration. According to various embodiments of the present disclosure, operations performed by the module, the program, or another component may be carried out sequentially, in parallel, repeatedly, or heuristically, or one or more of the operations may be executed in a different order or omitted, or one or more other operations may be added.

Figure 2:
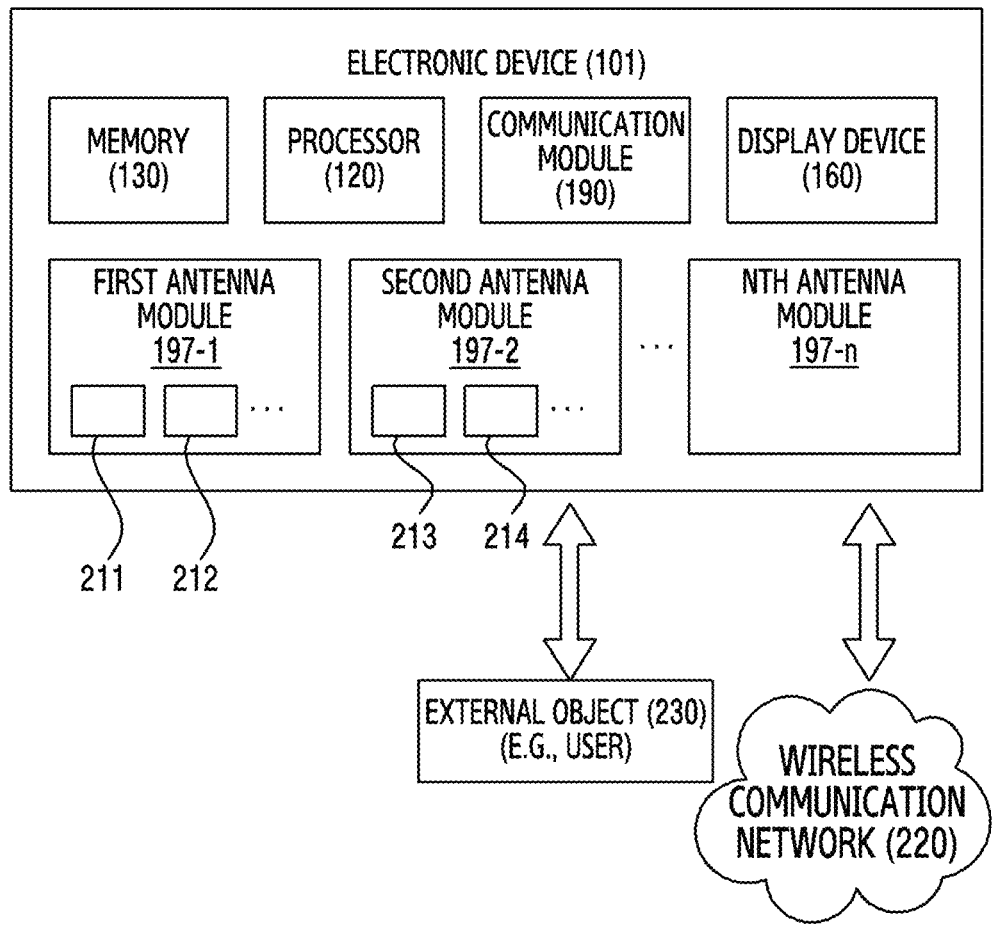
FIG. 2 illustrates a block diagram of an electronic device according to various embodiments of the present disclosure.

FIG. 2 illustrates a block diagram of an electronic device 101 according to various embodiments of the present disclosure. The electronic device 101 of FIG. 2 may correspond to the electronic device 101 of FIG. 1. The electronic device 101 may correspond to at least one of a smart phone, a smart pad, a tablet PC, a personal digital assistant (PDA), a laptop PC or a desktop PC. The electronic device 101 may correspond to a wearable device which includes at least one of an accessory type (e.g., a watch, a ring, a wristlet, an anklet, a necklace, glasses, a contact lens, or a head-mounted-device (HMD)), a fabric or clothing integrated type (e.g., electronic clothes), a human-body mount type (e.g., a skin pad or tattoo), or a bio implantation type (e.g., an implantable circuit). The electronic device 101 may be home appliances such as a refrigerator, a television (TV), a cleaner, an air conditioner, a washing machine and a lighting device.

Referring to FIG. 2, the electronic device 101 of various embodiments may include at least one of a processor 120, a memory 130, a communication module 190, and a display device 160. The electronic device 101 of various embodiments may include at least one antenna module related to radio frequency (RF) and/or microwave. In various embodiments, the number of antenna modules included in the electronic device 101 may be different. Referring to FIG. 2, the electronic device 101 of an embodiment may include antenna modules (a first antenna module 197-1, a second antenna module 197-2, . . . , an n-th antenna module 197-n). In the electronic device 101 of an embodiment, the processor 120, the memory 130, the communication module 190, the display device 160, and/or the at least one antenna module may be operably and/or electrically connected through a communication bus (not shown).

The processor 120 may execute one or more instructions stored in the memory 130. The processor 120 may include at least one of a circuit for processing data, for example, an integrated circuit (IC), an arithmetic logic unit (ALU), a field programmable gate array (FPGA), and a large scale integration (LSI). The memory 130 may store data related to the electronic device 101. The memory 130 may include a volatile memory such as a random access memory (RAM) including a static random access memory (SRAM) or a dynamic RAM (DRAM), or may include a non-volatile memory such as not only a read only memory (ROM), a magneto resistive RAM (MRAM), a spin-transfer torque MRAM (STT-MRAM), a phase-change RAM (PRAM), a resistive RAM (RRAM), and a ferroelectric RAM (FeRAM), but also a flash memory, an embedded multi media card (eMMC), and a solid state drive (SSD). Although one processor 120 and one memory 130 are illustrated, in various embodiments, the number of the processors 120 and the memories 130 included in the electronic device 101 may be one or more.

The memory 130 may store instructions related to an application and instructions related to an operating system (OS). The operating system is system software executed by the processor 120. By executing the operating system, the processor 120 may manage hardware components included in the electronic device 101. The operating system may present an application programming interface (API) as an application that is software other than the system software.

One or more applications which are a set of a plurality of instructions may be installed in the memory 130. That the application is installed in the memory 130 may mean that the application is stored in a format which is executable by the processor 120 connected to the memory 130.

The display device 160 may visually output information to a user by using at least one of organic light emitting diodes (OLEDs), liquid crystal displays (LCDs), and light emitting diodes (LEDs). In order to more intuitively control a user interface (UI) outputted through the display device 160, the electronic device 101 may include a touch screen panel (TSP) (not shown) disposed on the display device 160. The touch sensor panel may touch the display device 160 or detect a location of an object (e.g., a user's finger, a stylus) hovering over the display device 160, by using at least one of a resistive film, a capacitive component, a surface acoustic wave, and an infrared ray.

The communication module 190 may connect the electronic device 101 to a wireless communication network 220 such as Bluetooth, wireless fidelity (WiFi), near field communication (NFC), long term evolution (LTE), and 5G new radio (NR), and a wired communication network such as a local area network (LAN) and Ethernet. The communication module 190 may include at least one of a communication circuit, a communication processor (CP), and a communication interface supporting at least one wireless communication standard and/or at least one wired communication standard.

According to various embodiments of the present disclosure, at least one antenna module (e.g., the first antenna module 197-1, the second antenna module 197-2, . . . , the nth antenna module 197-n) included in the electronic device 101 may include an antenna array which is formed in a patch type (or a pattern type) on a substrate (e.g., a printed circuit board (PCB)). The antenna array may include a conductive member which is disposed in a specified direction with respect to an axis of an antenna module and/or an antenna (e.g., in a direction transverse to the axis), or a plurality of conductors (e.g., an antenna element) of a dipole form.

In an embodiment of FIG. 2, the antenna module (e.g., the first antenna module 197-1 or the second antenna module 197-2) may include a plurality of antenna arrays (e.g., antenna arrays 211 and 212 or antenna arrays 213 and 214). The plurality of antenna arrays may include antenna elements for providing beams directed in different directions. For example, the antenna arrays 211, 212, 213, or 214 of FIG. 2 may be a 1×4 antenna array. The antenna array may output a directive and/or radioactive electromagnetic wave, based on the arrangement of the antenna elements. At least one antenna module included in the electronic device 101 may use, for example, a millimeter wave (e.g., a band of 25 GHz or higher) as an operating frequency band. The arrangement of the at least one antenna module and the at least one antenna array in the electronic device 101 will be described with reference to FIG. 4A to FIG. 4C.

The electronic device 101 of various embodiments may control at least one antenna module and/or at least one antenna array, to form an antenna beam in a space adjacent to the electronic device 101. The antenna beam may be referred to a space, direction, location in which the antenna module and/or the antenna array radiate an electromagnetic wave, and/or a form of the electromagnetic wave. When the antenna module and/or antenna array detect an external electromagnetic wave, the antenna beam may mean the space, direction, location in which the antenna module and/or antenna array may detect the external electromagnetic wave, and/or a form of the external electromagnetic wave. Hereinafter, the antenna beam may be referred to as a beam.

In various embodiments, a direction of a beam formed by the antenna array may vary according to the control of the electronic device 101. The electronic device 101 of various embodiments may distinguish directions of mutually different beams formable by the antenna array, based on a specified parameter such as a beam identifier. In an embodiment, the beam identifier may indicate a direction of a beam.

The electronic device 101 of various embodiments may store information for controlling the antenna array in the memory 130. In an embodiment, the information is information for controlling the antenna array, based on the beam identifier, and may include, for example, codebook information. The codebook information may be defined as information about a set of defined quantized channel vectors. The codebook information may be referred by various terms including a beam book or a precoding matrix. The codebook information may store data for providing beams of different directions, based on beam identifiers corresponding to the directions.

The electronic device 101 of various embodiments may control at least one antenna module and/or at least one antenna array, to connect to the wireless communication network 220. The wireless communication network 220 is a 5G network, and may be operated independently (e.g., stand-alone (SA)) of, or be operated in connection (e.g., non-stand alone (NSA)) to, other networks (e.g., legacy networks such as LTE) different from the 5G network. For example, the 5G network may include only an access network (e.g., a 5G radio access network (RAN) or a next generation RAN (NG RAN)), and not include a core network (e.g., a next generation core (NGC)). In this case, after the electronic device 101 accesses an access network of the wireless communication network 220 which is the 5G network, the electronic device 101 may access an external network (e.g., the Internet) under the control of a core network (e.g., an evolved packed core (EPC)) of a legacy network. Protocol information (e.g., LTE protocol information) for communication with the legacy network and/or protocol information (e.g., new radio (NR) protocol information) for communication with the 5G network may be stored in the memory 130, and may be accessed by the processor 120 and/or the communication module 190.

In an embodiment, in order for the electronic device 101 to connect to the wireless communication network 220, the electronic device 101 may control at least one antenna module and/or at least one antenna array to form a beam. By using the formed beam, the electronic device 101 may transmit and/or receive a radio signal. In an embodiment, when the electronic device 101 transmits the radio signal, based on a millimeter wave, the radio signal may be propagated in a specific direction, based on the straightness of the millimeter wave. The electronic device 101 of an embodiment may control the at least one antenna module and/or the at least one antenna array, based on beamforming, to propagate the radio signal toward an external electronic device (e.g., an access point (AP)) related to the wireless communication network 220.

When the radio signal being based on the millimeter wave propagates between the electronic device 101 and an external electronic device, the radio signal may be attenuated by an obstacle between the electronic device 101 and the external electronic device. For example, when an external object 230 is located between the electronic device 101 and the external electronic device, the radio signal may be blocked or attenuated by the external object 230. For example, the external object 230 may include a user of the electronic device 101.

By using the at least one antenna module and/or the at least one antenna array, the electronic device 101 of various embodiments may detect the external object 230 adjacent to the electronic device 101. In an embodiment, by adjusting a direction of a millimeter wave beam, based on beamforming, the electronic device 101 may detect the external object 230 adjacent to the electronic device 101. In an embodiment, the electronic device 101 may detect a distance between the external object 230 and the electronic device 101. As the electronic device 101 of various embodiments detects the external object 230 by using the at least one antenna module and/or the at least one antenna array, the electronic device 101 may detect the external object 230 located in a range of exceeding a range (e.g., a distance of less than 10 mm from the electronic device 101) detectable by a proximity sensor, a grip sensor and/or an illuminance sensor.

The electronic device 101 of various embodiments may transmit a first radio signal through any one (e.g., the first antenna array 211 or the third antenna array 213) of a plurality of antenna arrays, and may receive a second radio signal that corresponds to the first radio signal and is reflected from the external object 230, through the other one (e.g., the second antenna array 212 or the fourth antenna array 214) of the plurality of antenna arrays. In a state in which at least a part of the first radio signal transmitted through the first antenna array 211 or the third antenna array 213 is not reflected from the external object 230, it may be directly received by the second antenna array 212 or the fourth antenna array 214 receiving the second radio signal. The electronic device 101 of various embodiments may control a plurality of antenna arrays, to minimize the influence of the first radio signal propagated directly to the second antenna array 212 or the fourth antenna array 214 receiving the second radio signal. Below, a description will be made for an operation performed by the electronic device 101 of various embodiments so as to minimize the influence of the first radio signal directly propagated to the second antenna array 212 or the fourth antenna array 214 receiving the second radio signal.

Figure 3:
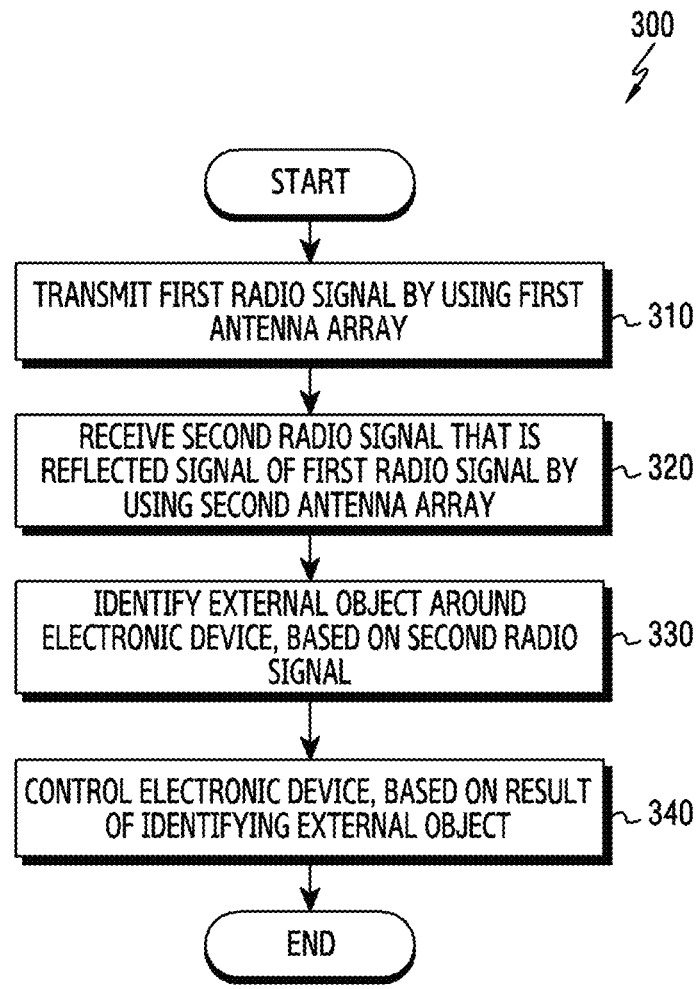
FIG. 3 illustrates a flowchart for explaining an operation of an electronic device according to various embodiments of the present disclosure.

FIG. 3 illustrates a flowchart 300 for explaining an operation of an electronic device of various embodiments of the present disclosure. The electronic device of FIG. 3 may correspond to the electronic device 101 of FIG. 1 to FIG. 2. The operation of FIG. 3 may be performed by at least one of the electronic device 101, the processor 120, and/or the communication module 190 of FIG. 1 to FIG. 2.

Referring to FIG. 3, in operation 310, the electronic device of various embodiments may transmit a first radio signal by using a first antenna array (e.g., the first antenna array 211 of FIG. 2). The first radio signal may be radiated to a space adjacent to the electronic device 101 based on an electromagnetic wave having directivity.

In an embodiment, the electronic device may transmit a first radio signal having a specified polarized wave by using the first antenna array. The polarized wave may mean an electromagnetic wave in which a vibration direction of an electric field is constant. In an embodiment, the first radio signal may be outputted through an electromagnetic wave having a specified polarized wave among a vertically-polarized wave, a horizontally-polarized wave, or a dual-polarized wave. The electronic device of various embodiments may form a beam directed in a specified direction by using the first antenna array, and transmit the first radio signal through the beam. In an embodiment, the electronic device may control the first antenna array, based on information (e.g., codebook information) corresponding to a beam identifier corresponding to the specified direction, to transmit the first radio signal. When an external object (e.g., the external object 230 of FIG. 2) is located in a space adjacent to the electronic device, the first radio signal may be reflected by the external object.

Referring to FIG. 3, in operation 320, the electronic device of various embodiments may receive a second radio signal that is a reflected signal of the first radio signal, by using a second antenna array (e.g., the second antenna array 212, the third antenna array 213 or the fourth antenna array 214 of FIG. 2). The second antenna array may be different from the first antenna array for transmitting the first radio signal of operation 310. The second antenna array may be included in an antenna module (e.g., the first antenna module 197-1 of FIG. 2) including the first antenna array, or may be included in another antenna module (e.g., the second antenna module 197-2) different from the antenna module including the first antenna array.

The electronic device of an embodiment may receive the second radio signal that is the reflected signal of the first radio signal and has a specified polarized wave, by using the second antenna array different from the first antenna array. For example, when the first radio signal is transmitted through an electromagnetic wave having a horizontally-polarized wave, the electronic device may control the second antenna array to receive the electromagnetic wave having the horizontally-polarized wave, to receive the second radio signal. The electronic device may control the second antenna array, based on a direction of a beam used for transmission of the first radio signal, to receive the second radio signal. The direction of the beam of the second antenna array controlled by the electronic device may be different according to an embodiment. For example, the direction of the beam of the first antenna array and the direction of the beam of the second antenna array may coincide with each other or may be different from each other. An operation in which the electronic device of various embodiments adjusts the direction of the beam of the second antenna array will be described with reference to the following drawings (e.g., FIG. 5, FIG. 7 and/or FIG. 9).

Referring to FIG. 3, in operation 330, the electronic device of various embodiments may identify an external object around the electronic device, based on the second radio signal received in operation 330. In an embodiment, the electronic device may identify the external object, based on an antenna gain of the second antenna array receiving the second radio signal. The antenna gain may mean a ratio between a power density in a radiation direction (e.g., boresight) of an antenna array and a power density of a reference antenna (e.g., an omni-directional antenna). The electronic device of various embodiments may determine whether an external object is located adjacent to the electronic device, based on the antenna gain of the second antenna array and/or a strength of the second radio signal.

Referring to FIG. 3, in operation 340, the electronic device of various embodiments may control the electronic device, based on a result of identifying the external object in operation 330. In response to identifying the external object (e.g., the external object 230 of FIG. 2), the electronic device of various embodiments may perform an operation corresponding to the identified external object. In an embodiment, in response to identifying the external object, the electronic device may display a user interface (UI) being based on the external object in a display. In an embodiment, in response to identifying the external object, the electronic device may adjust a beam used to communicate with a wireless communication network (e.g., the wireless communication network 220 of FIG. 2). In an embodiment, in response to identifying the external object, the electronic device connected to any one of a plurality of APs included in the wireless communication network may connect (hand-over) to another AP different from the connected AP. In an embodiment, in response to identifying the external object, the electronic device may switch an access method used to connect to the wireless communication network (e.g., the wireless communication network 220 of FIG. 2) (e.g., may switch from an access method based on a 5G wireless communication network to an access method based on an LTE communication network).

In an embodiment, an operation corresponding to the external object may include a wake-up operation of converting a state of the electronic device from a sleep state to an active state. In an embodiment, the active state may mean a state in which a processor (e.g., the processor 120 of FIG. 1 to FIG. 2) of the electronic device receives a power greater than or equal to a normal power, a reference power, and/or a specified power. In an embodiment, the active state may mean a state in which the electronic device may display a UI through a display device, or execute one or more instructions in order to receive a user input through an input device. In an embodiment, the sleep state is a state different from the active state, and may mean a state in which the electronic device does not require booting so as to enter the active state. In an embodiment, the sleep state may mean a state in which the processor of the electronic device receives a power less than the normal power, the reference power, and/or the specified power. In an embodiment, the sleep state may include one or more of an inactive state, an idle state, a standby state, or a low power state.

In an embodiment, an operation corresponding to the external object may include an operation of controlling or adjusting a connection between an electronic device and a wireless network. For example, in a state of transmitting or receiving a third radio signal for communicating with a wireless network by using at least one of a plurality of antenna arrays (e.g., the first antenna array 211 or the second antenna array 212 of FIG. 2), the electronic device may identify the external object, based on at least one of operations of FIG. 3. In response to identifying the external object, the electronic device may adjust the third radio signal for communicating with the wireless network. For example, the electronic device may change a beam corresponding to the third radio signal or change a strength of the third radio signal.

Figure 4A:
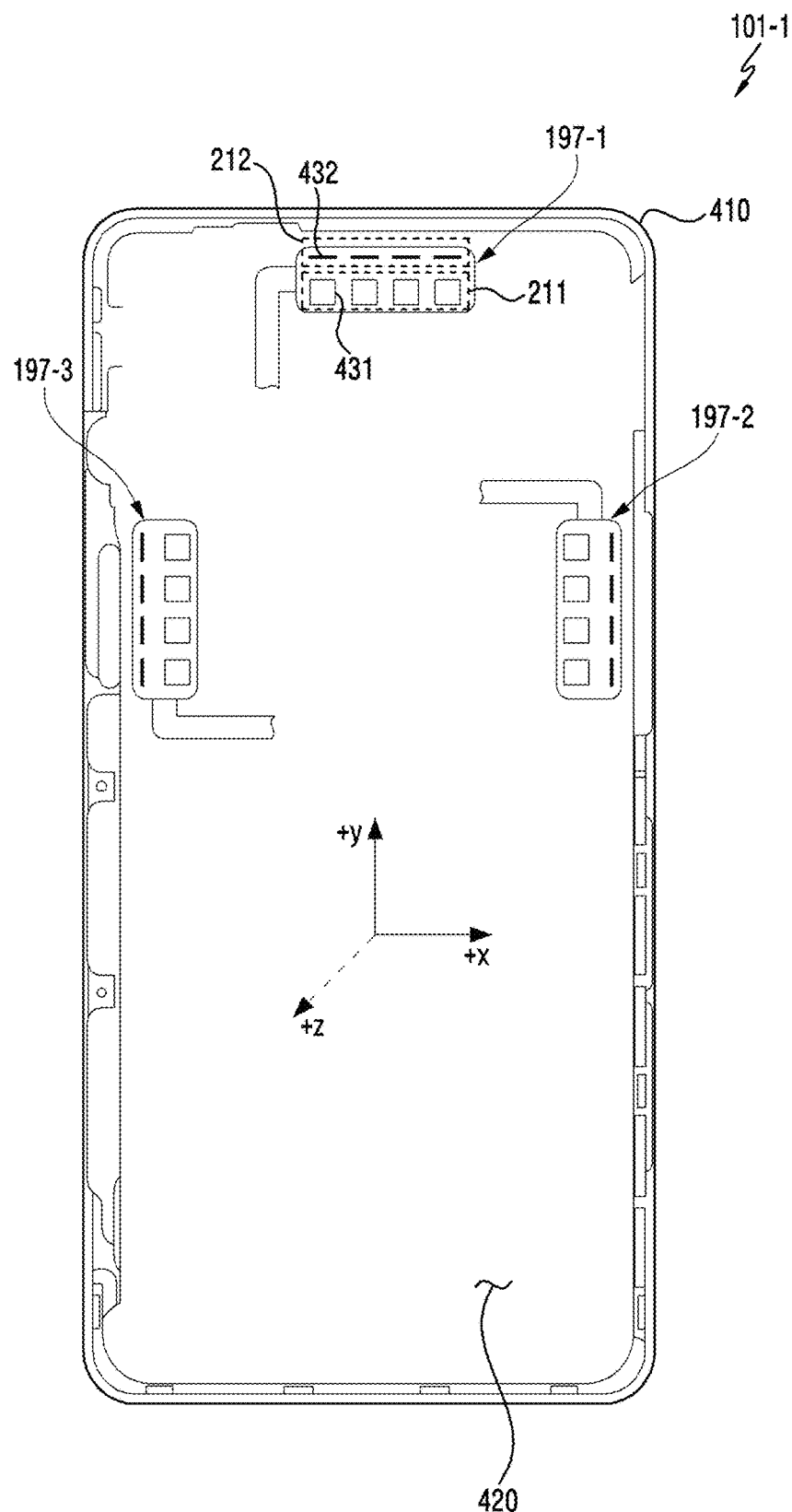
FIG. 4A illustrates an exemplary diagram for explaining the arrangement of at least one antenna module in electronic devices according to various embodiments of the disclosure.
Figure 4B:
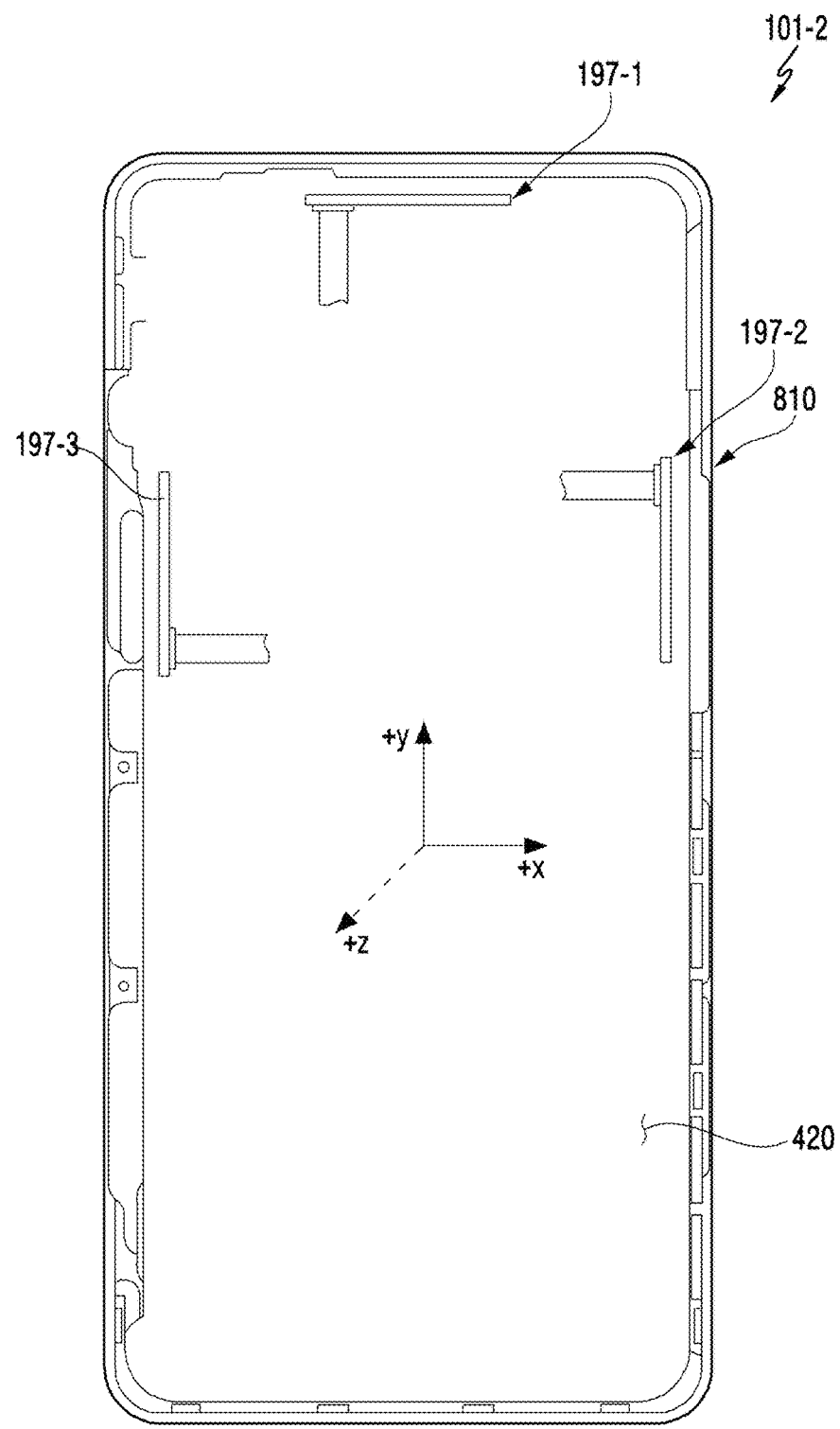
FIG. 4B illustrates an exemplary diagram for explaining the arrangement of at least one antenna module in electronic devices according to various embodiments of the disclosure.
Figure 4C:
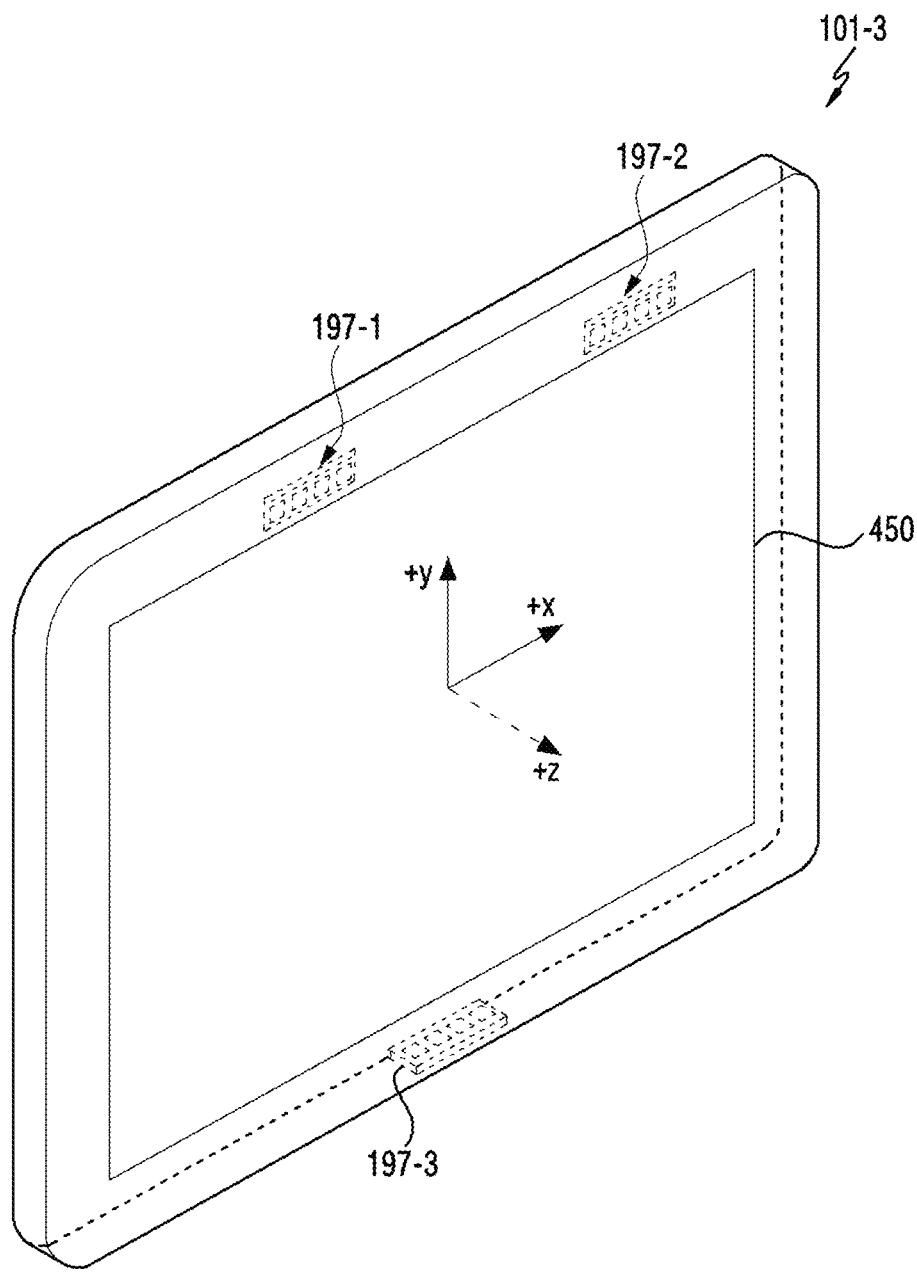
FIG. 4C illustrates an exemplary diagram for explaining the arrangement of at least one antenna module in electronic devices according to various embodiments of the present disclosure.

FIG. 4A illustrates a diagram for explaining the arrangement of antenna modules 197-1, 197-2 and 197-3 in electronic devices 101-1, 101-2, and 101-3 according to various embodiments of the present disclosure. FIG. 4B illustrates a diagram for explaining the arrangement of antenna modules 197-1, 197-2 and 197-3 in electronic devices 101-1, 101-2, and 101-3 according to various embodiments of the present disclosure. FIG. 4C illustrates a diagram for explaining the arrangement of antenna modules 197-1, 197-2 and 197-3 in electronic devices 101-1, 101-2, and 101-3 according to various embodiments of the present disclosure. The electronic devices 101-1, 101-2, and 101-3 of FIG. 4A to FIG. 4C may be related to the electronic device 101 of FIG. 1 to FIG. 2.

Referring to FIG. 4A, the electronic device 101-1 of various embodiments may include a housing 410. In an embodiment, the antenna modules 197-1, 197-2 and 197-3 may be disposed in an internal space 420 of the electronic device 101-1 that is separated by the housing 410. For example, the antenna modules 197-1, 197-2, and 197-3 may be disposed adjacent to a side surface of the housing 410 within the rectangular parallelepiped housing 410.

In each of the antenna modules 197-1, 197-2, and 197-3, one or more antenna arrays may be disposed. Referring to FIG. 4A, a plurality of antenna arrays (the first antenna array 211 and the second antenna array 212) disposed in the first antenna module 197-1 are illustrated. The first antenna array 211 may include a plurality of antenna elements (e.g., an antenna element 431) formed in an array form. The second antenna array 212 may also include a plurality of antenna elements (e.g., an antenna element 432) formed in an array form. The plurality of antenna elements may be disposed to be spaced a specified interval apart on a substrate of the first antenna module 197-1. The specified interval may be related to a frequency and/or wavelength of a radio signal transmitted or received through the first antenna module 197-1. For example, the specified interval may correspond to a half of the wavelength. The wavelength may be included in a millimeter wave wavelength band.

In an embodiment, the electronic device 101-1 may form a beam directed to an upper-side surface (e.g., +y direction) of the housing 410, by using the second antenna array 212 of the first antenna module 197-1. The electronic device 101-1 may form a beam directed to a front surface (e.g., +z direction) and/or rear surface (e.g., -z direction) of the housing 410, by using the first antenna array 211 of the first antenna module 197-1. In an embodiment, the electronic device 101-1 may form a beam directed to a right-side surface (e.g., +x direction) of the housing 410 and/or the beam directed to the front surface and/or rear surface of the housing 410, by using at least one of antenna arrays of the second antenna module 197-2. In an embodiment, the electronic device 101-1 may form a beam directed to a left-side surface (e.g., -x direction) of the housing 410 and/or the beam directed to the front surface and/or rear surface of the housing 410, by using at least one of antenna arrays of the third antenna module 197-3.

According to various embodiments of the present disclosure, a portion of the housing 410 adjacent to a portion of the internal space 420 in which the plurality of antenna modules 197-1, 197-2 and 197-3 are disposed may be formed of other materials (e.g., a dielectric material) not a conductive material in order to prevent a deterioration of the radiation performance of the antenna module. The material of the portion of the housing 410 may be varied according to various embodiments of the present disclosure, and for example, in the portion of the housing 410, a hole related to a beamforming direction may be formed, or a metal period structure (e.g., a metal grid) through which a beam is possible to pass may be formed.

In an embodiment, the antenna module may include a phase shifter (not shown). For example, the first antenna module 197-1 may include a plurality of phase shifters which correspond to the antenna arrays (e.g., the first antenna array 211 and the second antenna array 212) and/or the plurality of antenna elements. Each of the plurality of phase shifters may adjust a beam direction, by delaying an output time of a radio signal of the corresponding antenna element.

For example, when a first beam directed in a +y direction is formed using the second antenna array 212, the electronic device 101-1 may control the plurality of phase shifters corresponding to the plurality of antenna elements of the second antenna array 212 to have a phase delay. For example, the electronic device 101-1 may control each of the plurality of phase shifters to have a phase delay of 0 degree and/or 180 degrees.

For example, when a second beam rotated by 30 degrees from the +y direction to a left direction is formed using the second antenna array 212, the electronic device 101-1 may control the plurality of phase shifters wherein a phase delay of the plurality of phase shifters increases by 30 degrees in the left direction. For example, the phase shifter corresponding to the antenna element 432 may have a phase delay of 90 degrees, and be controlled to have a phase delay of 60 degrees, 30 degrees, and 0 degree from a phase shifter of an antenna element close to the antenna element 432, respectively.

For example, when a third beam rotated by 30 degrees from the +y direction to a right direction is formed using the second antenna array 212, the electronic device 101-1 may control the plurality of phase shifters wherein a phase delay of the plurality of phase shifters increases by 30 degrees in the right direction. For example, the phase shifter corresponding to the antenna element 432 may have a phase delay of 0 degree, and be controlled to have a phase delay of 30 degrees, 60 degrees, and 90 degrees from a phase shifter of an antenna element close to the antenna element 432, respectively.

The above-described first to third beams each may correspond to different beam identifiers. That the electronic device 101-1 controls the first antenna module 197-1 and/or the second antenna array 212, based on any one of the first beam to the third beam, for example, may be performed for the transmission of the first radio signal of operation 310 of FIG. 3 or the reception of the second radio signal of operation 320 of FIG. 3. Similarly to the above-described operation of controlling the first antenna module 197-1 and/or the second antenna array 212, the electronic device 101-1 may control the second antenna module 197-2, the third antenna module 197-3, or the antenna arrays of the second antenna module 197-2 and third antenna module 197-3.

Referring to FIG. 4A, the first antenna module 197-1 to the third antenna module 197-3 may be disposed wherein the first antenna arrays 211 of the first antenna module 197-1 to the third antenna module 197-3 face the front surface or rear surface of the housing 410 in the internal space 420. The arrangement of the first antenna module 197-1 to the third antenna module 197-3 in the internal space 420 may be different according to an embodiment. Referring to an embodiment of the electronic device 101-2 illustrated in FIG. 4B, the first antenna module 197-1 to the third antenna module 197-3 may be disposed wherein the first antenna arrays 211 of the first antenna module 197-1 to the third antenna module 197-3 face the side surface of the housing 410 in the internal space 420.

The first antenna module 197-1 to the third antenna module 197-3 may be disposed similarly in the electronic device 101-3 of a form of FIG. 4C as well as a form such as the electronic device 101-1 of FIG. 4A and the electronic device 101-2 of FIG. 4B. Referring to FIG. 4C, the first antenna arrays 211 of the first antenna module 197-1 and the second antenna module 197-2 may be disposed in the internal space of the electronic device 101-3 to face the +z direction of the electronic device 101-3 in which the display 450 is disposed. The first antenna array 211 of the third antenna module 197-3 may be disposed in the internal space of the electronic device 101-3 to face the −y direction of the electronic device 101-3.

When the electronic device 101-3 includes antenna modules disposed in the same direction (e.g., the +z direction of the electronic device 101-3) such as the first antenna module 197-1 and the second antenna module 197-2 of FIG. 4C, the electronic device 101-3 of an embodiment may decrease interference and/or performance degradation between the antenna modules while detecting an external object, in a state of controlling, based on the same beam, the antenna modules. An operation performed by the electronic device 101-3 by using the antenna modules disposed in the same direction will be described with reference to FIG. 7 to FIG. 8.

Figure 5:
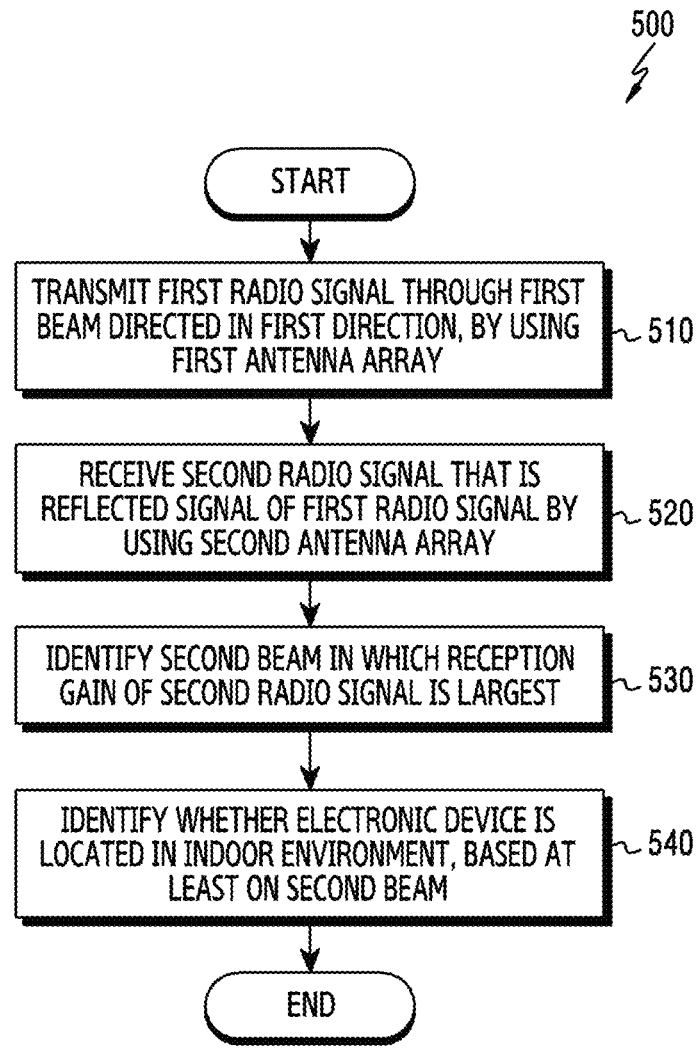
FIG. 5 illustrates a flowchart for explaining an operation of an electronic device according to various embodiments of the present disclosure.

FIG. 5 illustrates a flowchart 500 for explaining an operation of the electronic device 101 according to various embodiments of the present disclosure. The electronic device 101 of FIG. 5 may correspond to the electronic device 101 of FIG. 1 to FIG. 2. The operation of FIG. 5 may be performed by at least one of the electronic device 101, the processor 120, and/or the communication module 190 of FIG. 1 to FIG. 2. At least one of operations of FIG. 5 may be performed in relation to, or similar to, at least one of operations of FIG. 3.

Referring to FIG. 5, in operation 510, the electronic device (e.g., the electronic device 101 of FIG. 2) of various embodiments may transmit a first radio signal through a first beam directed in a first direction, by using a first antenna array (e.g., the first antenna array 211 of FIG. 2). The electronic device of an embodiment may perform operation 510 similarly to operation 310 of FIG. 3. When the electronic device of an embodiment includes a plurality of antenna modules (e.g., the first antenna module 197-1 to the second antenna module 197-2 of FIG. 2), the electronic device may control a first antenna module among the plurality of antenna modules, and radiate an electromagnetic wave having a specified polarized wave (e.g., a horizontally-polarized wave), based on the first beam. The electromagnetic wave may be radiated in the first direction corresponding to the first beam. The electromagnetic wave may include the first radio signal.

Referring to FIG. 5, in operation 520, the electronic device of various embodiments may receive a second radio signal that is a reflected signal of the first radio signal, by using a second antenna array (e.g., the second antenna array 212, the third antenna array 213, or the fourth antenna array 214 of FIG. 2). For example, the second radio signal may mean the first radio signal reflected from an external object adjacent to the electronic device. For example, the second radio signal may correspond to the first radio signal sequentially reflected from at least two external objects (e.g., a user and a wall) adjacent to the electronic device. The second radio signal may have the same polarized wave and/or the same wavelength as the first radio signal. The electronic device of an embodiment may perform operation 520 similarly to operation 320 of FIG. 3. When the electronic device of an embodiment includes the plurality of antenna modules (e.g., the first antenna module 197-1 to the second antenna module 197-2 of FIG. 2), the electronic device may control a second antenna module different from the first antenna module for transmitting the first radio signal, to receive the second radio signal.

In an embodiment, the electronic device may receive the second radio signal by using at least one beam formable within the second antenna array. The second antenna array may be included in the second antenna module for receiving the second radio signal. For example, the electronic device may transmit the first radio signal by using the first antenna array disposed toward a first surface of the housing. In this case, the electronic device may receive the second radio signal by using the second antenna array disposed toward a second surface of the electronic device that is different from the first surface. In an embodiment, the first antenna array and the second antenna array each may be included in the first antenna module and the second antenna module.

Referring to FIG. 5, in operation 530, the electronic device of various embodiments may identify a second beam in which a reception gain of the second radio signal is largest. The electronic device of an embodiment may identify the second beam by sequentially forming a plurality of beams formable in the second antenna array, based on, for example, beam sweeping. For example, the electronic device may identify the second beam in which a reception gain of the second radio signal is largest among a plurality of beams. The reception gain may be related to an antenna gain of the second antenna array.

Referring to FIG. 5, in operation 540, the electronic device of various embodiments may identify whether the electronic device is located in an indoor environment, based at least on the second beam. The electronic device of an embodiment may identify whether the electronic device is located in the indoor environment, based on a second direction corresponding to the second beam identified in operation 530. For example, a direction (e.g., a first beam and/or a first direction) in which the electronic device transmits a first radio signal and a direction (e.g., a second beam and/or a second direction) in which the electronic device receives a second radio signal may be different from each other. The electronic device of an embodiment may determine that the electronic device is located in the indoor environment, in response to identifying the second beam directed in the second direction different from the first direction. In response to identifying the second beam, the electronic device of an embodiment may determine at least one of whether the electronic device is located in the indoor environment or whether the external object is adjacent to the electronic device. Hereinafter, an operation in which the electronic device of an embodiment detects a location of the electronic device and the external object by using a directional radio signal will be described with reference to FIG. 6.

Figure 6:
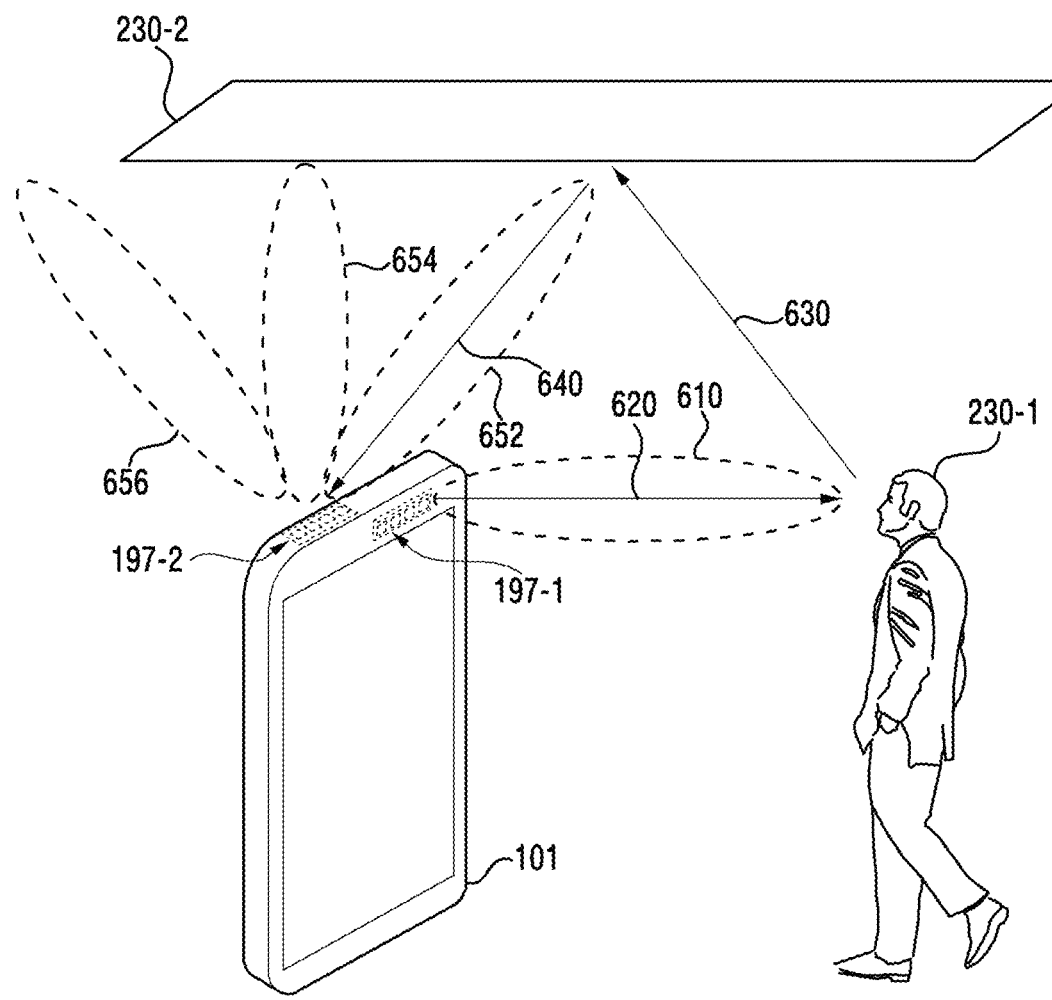
FIG. 6 illustrates a diagram for explaining an operation in which an electronic device identifies external objects according to various embodiments of the present disclosure.

FIG. 6 illustrates a diagram for explaining an operation in which the electronic device 101 of various embodiments identifies external objects 230-1 and 230-2. The electronic device 101 of FIG. 6 may correspond to the electronic device 101 of FIG. 1 to FIG. 2. The electronic device 101 of FIG. 6 may perform at least one of operations of FIG. 3 and/or FIG. 5.

Referring to FIG. 6, the electronic device 101 of an embodiment may control the first antenna module 197-1 to transmit a first radio signal 620 through a first beam 610 propagated toward a front surface of the electronic device 101. That the electronic device 101 transmits the first radio signal 620 may be performed, for example, based on operation 510 of FIG. 5. As the first radio signal 620 is propagated toward the front surface of the electronic device 101, based on the first beam 610, the first radio signal 620 may reach the external object 230-1 adjacent to the front surface of the electronic device 101. The external object 230-1 may correspond to, for example, a user.

The first radio signal 620 reaching the user may be reflected in one or more directions different from an incidence direction. Referring to FIG. 6, a part of the first radio signal 620 may be reflected in a direction 630 different from the incidence direction. The first radio signal 620 reflected along the direction 630 may reach the external object 230-2 different from the external object 230-1. The external object 230-2 may mean, for example, a wall surface of a building, such as a ceiling.

Referring to FIG. 6, the electronic device 101 of an embodiment may control the second antenna module 197-2 disposed in a different direction from the first antenna module 197-1, to receive a second radio signal 640 corresponding to a reflected signal of the first radio signal 620. That the electronic device 101 receives the second radio signal 640 may be performed, for example, based on operation 520 of FIG. 5.

The electronic device 101 of an embodiment may receive the second radio signal 640, by using at least one of a plurality of beams 652, 654, and 656 formable by the second antenna module 197-2. The electronic device 101 of an embodiment may identify the beam 652 in which a gain of the second radio signal 640 is largest, based on, for example, operation 530 of FIG. 5. The direction of the beam 652 may correspond to a direction of the second radio signal 640 reaching the second antenna module 197-2.

In response to identifying the beam 652 and/or the second radio signal 640, the electronic device 101 of an embodiment, for example, may determine whether the electronic device 101 is located indoors and/or whether the external object 230-1 is adjacent to the electronic device 101, based on operation 540 of FIG. 5. When the electronic device 101 receives a reflected signal of the first radio signal 620 by using only the first antenna module 197-1 for transmitting the first radio signal 620, the first antenna module 197-1 may suffer from an error caused by a radio signal (e.g., a radio signal directly radiated from a transmission antenna array of the first antenna module 197-1 to a reception antenna array) other than the reflected signal. The electronic device 101 of an embodiment may prevent the error by using the first antenna module 197-1 and the second antenna module 197-2 directing in mutually different directions, while determining whether the electronic device 101 is located indoors and/or whether the external object 230-1 is adjacent to the electronic device 101.

In an embodiment, when the electronic device 101 performs all of the transmission and reception of the radio signal by using the plurality of antenna modules, the electronic device 101 may adjust a strength of the radio signal in order to prevent the error. Hereinafter, an embodiment in which the electronic device 101 adjusts the strength of the radio signal will be described with reference to FIG. 7 to FIG. 8.

Figure 7:
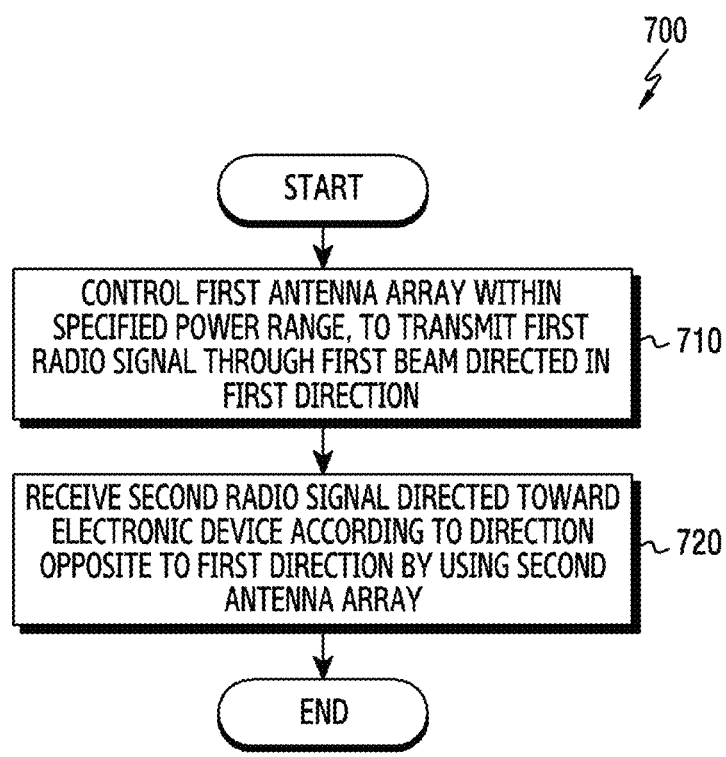
FIG. 7 illustrates a flowchart for explaining an operation of an electronic device according to various embodiments of the present disclosure.

FIG. 7 illustrates a flowchart 700 for explaining an operation of an electronic device according to various embodiments of the present disclosure. The electronic device of FIG. 7 may correspond to the electronic device 101 of FIG. 1 to FIG. 2. The operation of FIG. 7 may be performed by at least one of the electronic device 101, the processor 120 and/or the communication module 190 of FIG. 1 to FIG. 2.

Referring to FIG. 7, in operation 710, the electronic device of various embodiments may control a first antenna array (e.g., the first antenna array 211 of FIG. 2) within a specified power range, to transmit a first radio signal through a first beam directed in a first direction. The electronic device of an embodiment may control the first antenna array within a specified power range less than a specified first power of the first antenna array, to transmit the first radio signal through the first beam directed in the first direction. For example, the electronic device may control the first antenna array by power of less than 20 dB to 30 dB compared to the first power of the first antenna array, to transmit the first radio signal. In an embodiment, that the electronic device transmits the first radio signal based on operation 710 may be performed similarly to operation 310 of FIG. 3.

Referring to FIG. 7, in operation 720, the electronic device of various embodiments may receive a second radio signal by using a second antenna array (e.g., the second antenna array 212 of FIG. 2). When the electronic device of an embodiment transmits the first radio signal of operation 710 by using a first antenna array included in a specific antenna module, the electronic device may receive the second radio signal of operation 720 by using a second antenna array included in the specific antenna module. The second radio signal may mean a reflected signal of the first radio signal reflected by an external object. For example, the second radio signal may have the same polarized wave and/or the same wavelength as the first radio signal. In an embodiment, receiving the second radio signal by the electronic device based on operation 720 may be performed similarly to operation 320 of FIG. 3.

An operation performed by the electronic device of an embodiment after the reception of the second radio signal based on operation 720 may be similar to at least one of operations 330 and 340 of FIG. 3. For example, in response to the reception of the second radio signal, the electronic device may identify an external object or display a UI corresponding to the identified external object. As the electronic device of an embodiment transmits the first radio signal, based on the specified power range, the reception of a radio signal (e.g., a radio signal radiated directly from the first antenna array to the second antenna array) affecting the identification of the external object in addition to the second radio signal may be minimized. The specified power range may be determined heuristically in consideration of a gain of the radio signal directly radiated from the first antenna array to the second antenna array.

Figure 8:
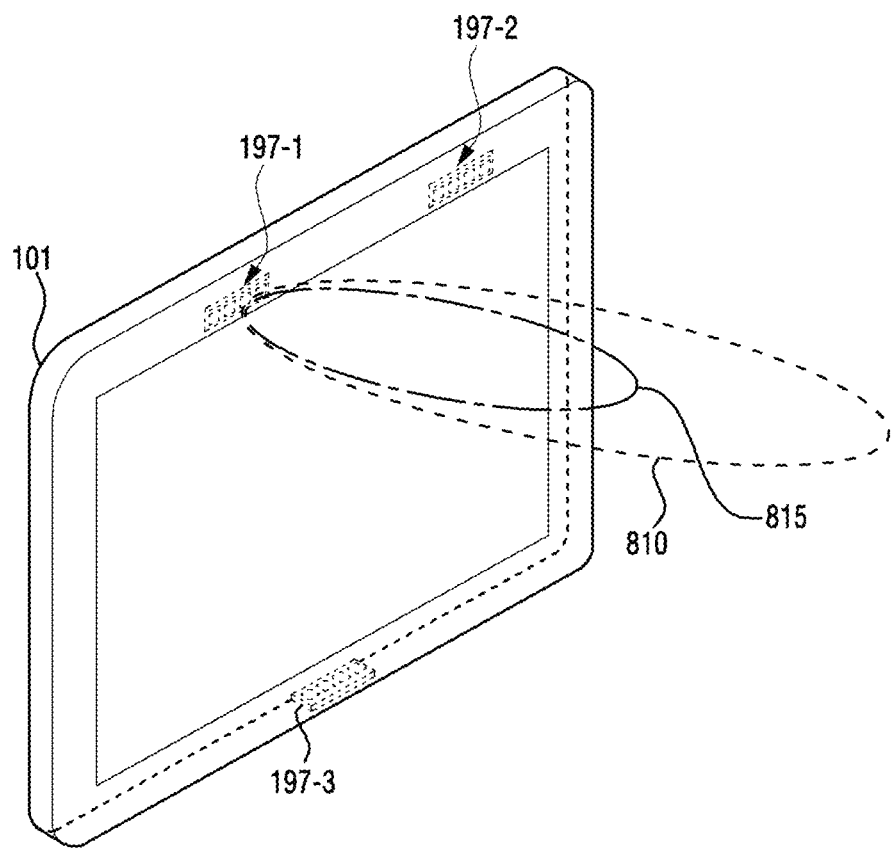
FIG. 8 illustrates a diagram for explaining an operation in which an electronic device identifies an external object by using a beam of a specific direction according to various embodiments of the present disclosure.

FIG. 8 illustrates a diagram for explaining an operation in which the electronic device 101 identifies an external object by using a beam of a specific direction according to various embodiments of the present disclosure. The electronic device 101 of FIG. 8 may correspond to the electronic device 101 of FIG. 1 to FIG. 2. The electronic device 101 of FIG. 8 may correspond to any one (e.g., the electronic device 101-3) of the electronic devices 101-1, 101-2, and 101-3 of FIG. 4A to FIG. 4C. The electronic device 101 of FIG. 8 may perform at least one of operations of FIG. 3 and/or FIG. 7.

Referring to FIG. 8, the first antenna array 211 and the second antenna array 212 included in one (e.g., a first antenna module 197-1 or a second antenna module 197-2) of a plurality of antenna modules included in the electronic device 101 of an embodiment may be disposed toward the same direction (e.g., the front surface of the electronic device 101). When detecting the external object by using the plurality of antenna arrays 211 and 212 disposed in the same direction, the electronic device 101 may fail to accurately detect the external object because of the reception of a radio signal other than a radio signal reflected from the external object.

For example, when the first antenna array 211 and the second antenna array 212 installed in the first antenna module 197-1 or the second antenna module 197-2 are disposed in the same direction, or an external object is detected using all of the first antenna module 197-1 and the second antenna module 197-2 disposed close to each other, the electronic device 101 may receive a radio signal directed to the first antenna array 211 and/or the second antenna array 212 without being reflected from the external object. The radio signal may disturb that the electronic device 101 detects the external object.

Referring to FIG. 8, in a state in which the electronic device 101 controls the first antenna array 211 and/or the second antenna array 212 of the first antenna module 197-1 based on the first power, a beam 810 formed by each of the first antenna array 211 and the second antenna array 212 may be the same. The electronic device 101 of an embodiment, for example, may control the first antenna array 211 and/or the second antenna array 212, based on a specified second power range less than the first power (e.g., power less than 20 dB to 30 dB compared to the first power), based on operation 710 of FIG. 7.

Referring to FIG. 8, in a state in which the electronic device 101 controls the first antenna array 211 and/or the second antenna array 212 based on the specified second power range, a beam 815 formed by each of the first antenna array 211 and/or the second antenna arrays 212 may be the same. As each of the first antenna array 211 and/or the second antenna array 212 is controlled to be less than the first power, a size of the beam 815 may be less than a size of the beam 810 corresponding to the first power.

The electronic device 101 of an embodiment may transmit the first radio signal of operation 710 of FIG. 7 by using the beam 815. In response to the transmission of the first radio signal, the electronic device 101 may receive the second radio signal of operation 720 of FIG. 7 by using the beam 815. The electronic device 101 of an embodiment may independently control the first antenna array 211 and the second antenna array 212. By controlling the first antenna array 211 and the second antenna array 212 by less than the first power, the electronic device 101 may decrease a radio signal directed to the first antenna array 211 and/or the second antenna array 212 without being reflected from the external object.

The above-mentioned description of FIG. 8 has been made for controlling the first antenna array 211 and the second antenna array 212 installed in one antenna module, but may be identically applied to when using the first antenna array 211 installed in the first antenna module 197-1 and the second antenna array 212 installed in the second antenna module 197-2 adjacent to each other. In this case, beams provided by the respective antenna array 211 and 212 may be slightly different.

In an embodiment, the electronic device 101 may detect the external object by using a plurality of antenna modules (e.g., the first antenna module 197-1 and the second antenna module 197-2) disposed in the same direction. Hereinafter, an embodiment in which the electronic device 101 detects the external object by using the plurality of antenna modules will be described with reference to FIG. 9 and FIG. 10A to FIG. 10B.

Figure 9:
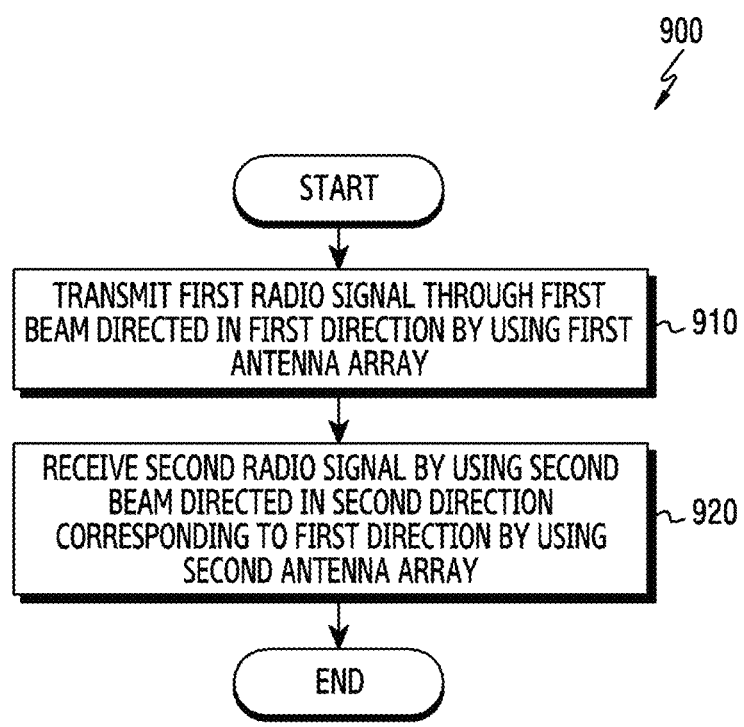
FIG. 9 illustrates a flowchart for explaining an operation of an electronic device according to various embodiments of the present disclosure.

FIG. 9 illustrates a flowchart 900 for explaining an operation of an electronic device according to various embodiments of the present disclosure. The electronic device of FIG. 9 may correspond to the electronic device 101 of FIG. 1 to FIG. 2. The operation of FIG. 9 may be performed by at least one of the electronic device 101, the processor 120, and/or the communication module 190 of FIG. 1 to FIG. 2. At least one of operations of FIG. 9 may be performed in relation to, or similar to, at least one of operations of FIG. 3.

Referring to FIG. 9, in operation 910, the electronic device of various embodiments may transmit a first radio signal through a first beam directed in a first direction, by using a first antenna array (e.g., the first antenna array 211 of FIG. 2). When the electronic device of an embodiment includes a plurality of antenna modules (e.g., the first antenna module 197-1 to the second antenna module 197-2 of FIG. 2), a first antenna array may be included in a first antenna module among the plurality of antenna modules. The electronic device of an embodiment may perform operation 910 similarly to operation 310 of FIG. 3.

Referring to FIG. 9, in operation 920, the electronic device of various embodiments may receive a second radio signal through a second beam directed in a second direction corresponding to the first direction, by using a second antenna array (e.g., the second antenna array 212, the third antenna array 213, or the fourth antenna array 214 of FIG. 2). For example, the second radio signal may mean the first radio signal reflected from an external object adjacent to the electronic device. The second radio signal may have the same polarized wave and/or the same wavelength as the first radio signal of operation 910. The electronic device of an embodiment may perform operation 920 similarly to operation 320 of FIG. 3.

When the electronic device of an embodiment includes the plurality of antenna modules (e.g., the first antenna module 197-1 to the second antenna module 197-2 of FIG. 2), a second antenna array may be included in a second antenna module different from the first antenna module including the first antenna array. The first antenna array (or the first antenna module) and the second antenna array (or the second antenna module) may be disposed to be spaced a specified distance apart in the electronic device. In an embodiment, the first antenna array (or the first antenna module) and the second antenna array (or the second antenna module) may be disposed in the same direction.

In an embodiment, the first direction of the first beam of the first antenna array of operation 910 and the second direction of the second beam of the second antenna array of operation 920 may not be parallel to each other. For example, the first beam directed in the first direction and the second beam directed in the second direction may be converged at one point in a space adjacent to the electronic device. Forms of the first beam and the second beam will be described with reference to FIG. 10A to FIG. 10B.

An operation performed by the electronic device of an embodiment after the receiving of the second radio signal based on operation 920 may be similar to at least one of operations 330 and 340 of FIG. 3. For example, in response to the reception of the second radio signal, the electronic device may identify an external object or display a UI corresponding to the identified external object. In response to identifying the external object based on the second radio signal of operation 920, the electronic device of an embodiment may acquire a distance between the electronic device and the external object, based on at least one of a distance between the first antenna array and the second antenna array, a first direction corresponding to a first radio signal, and a second direction corresponding to a second radio signal. Hereinafter, an operation in which the electronic device identifies the external object based on operation of FIG. 9 will be described with reference to FIG. 10A to FIG. 10B.

Figure 10A:
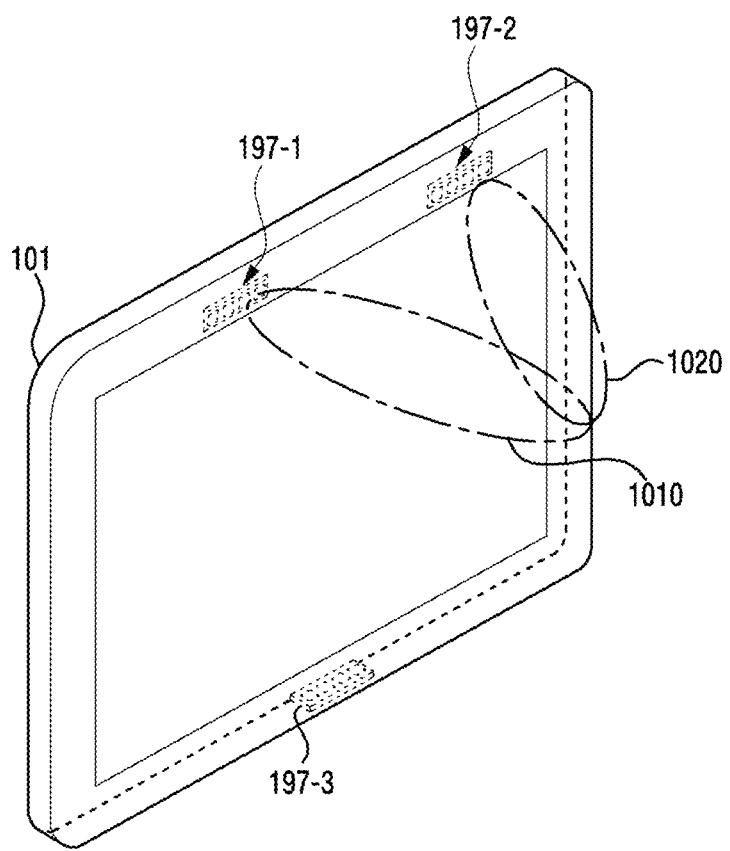
FIG. 10A illustrates a diagram for explaining an operation in which an electronic device identifies an external object based on beams of different directions according to various embodiments of the present disclosure.
Figure 10B:
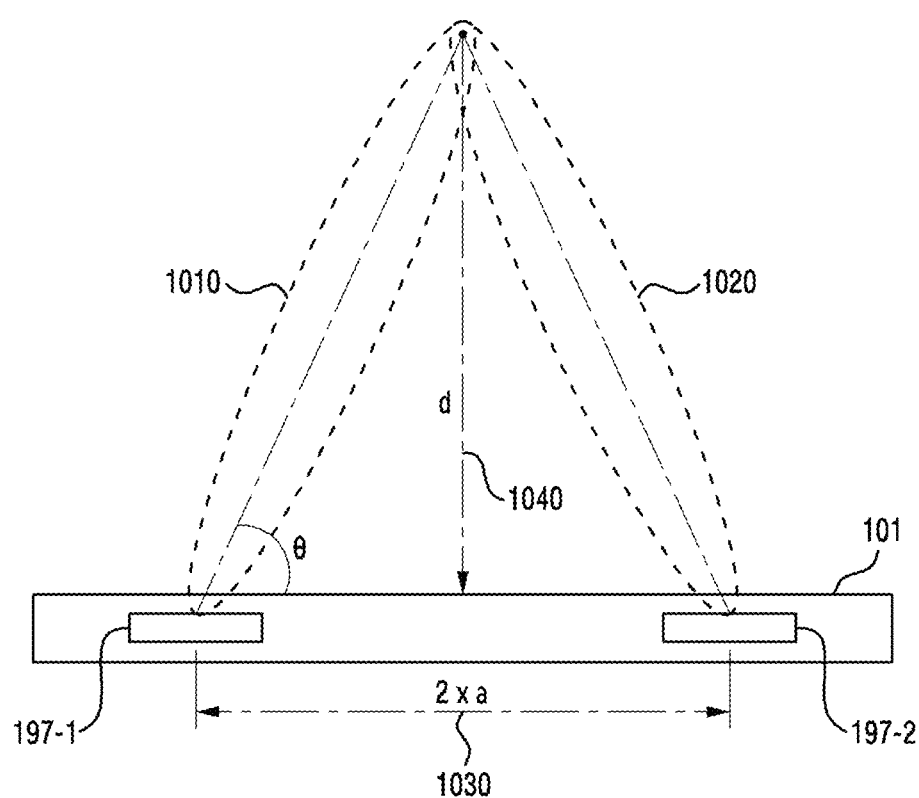
FIG. 10B illustrates a diagram for explaining an operation in which an electronic device identifies an external object, based on beams of different directions according to various embodiments of the present disclosure.

FIG. 10A illustrates a diagram for explaining an operation in which the electronic device 101 of various embodiments identifies an external object based on beams of different directions. FIG. 10B is a diagram for explaining an operation in which the electronic device 101 of various embodiments identifies an external object based on beams of different directions.

The electronic device 101 of FIG. 10A to FIG. 10B may correspond to the electronic device 101 of FIG. 1 to FIG. 2. The electronic device 101 of FIG. 10A to FIG. 10B may respond to any one (e.g., the electronic device 101-3) of the electronic devices 101-1, 101-2, and 101-3 of FIG. 4A to FIG. 4C. The electronic device 101 of FIG. 10A to FIG. 10B may perform at least one of operations of FIG. 3 and/or FIG. 9.

Referring to FIG. 10A, two (e.g., the first antenna module 197-1 and the second antenna module 197-2) of at least one of a plurality of antenna modules included in the electronic device 101 of an embodiment may be arranged in the same direction (e.g., the front surface of the electronic device 101). The electronic device 101 of an embodiment, for example, may control each of the first antenna module 197-1 and the second antenna module 197-2, based on operations of FIG. 9.

As in FIG. 10A, the electronic device 101 may control each of the first antenna module 197-1 and the second antenna module 197-2, to form a pair of beams 1010 and 1020 converged at any one point in an adjacent space in the electronic device 101. In an embodiment, in a state in which the electronic device 101 transmits the first radio signal of operation 910 of FIG. 9 by using the beam 1010 of the first antenna module 197-1, the electronic device 101 may receive the second radio signal of operation 920 of FIG. 9 by using the beam 1020 of the second antenna module 197-2.

According to an embodiment, the electronic device 101 may determine whether the external object is located in adjacent to the electronic device 101, based on a reception gain of the second radio signal received using the beam 1020 and/or an antenna gain of the second antenna module 197-2. The electronic device 101 of an embodiment may acquire a distance between the electronic device 101 and the external object, based on the reception gain of the second radio signal received using the beam 1020 and/or the antenna gain of the second antenna module 197-2.

Referring to FIG. 10B, the first antenna module 197-1 and the second antenna module 197-2 may be disposed to be separated as much as a specified distance (e.g., 2×a). When an angle (e.g., a beam angle) formed between each of the paired beams 1010 and 1020 and the housing of the electronic device 101 is θ, the shortest distance 1040 (d) between a point at which the beams 1010 and 1020 are converged and the electronic device 101 may be (a×tan θ). In a state of performing operations 910 and 920 of FIG. 9 by using the beams 1010 and 1020, the electronic device 101 may determine a distance between the electronic device 101 and the external object, as "d," based on the reception of the second radio signal and/or a strength of the received second radio signal.

The electronic device 101 of an embodiment may control the first antenna module 197-1 and the second antenna module 197-2, based on a beam identifier. The mutually different beam identifiers may correspond to mutually different directions (e.g., the beam angle (θ)). The beam identifier, the beam angle, and the distance 1040 of the electronic device 101 may correspond to each other as shown in Table 1.

TABLE 1

| Object recognition range/ distance (d) | Beam identifier (beam identifier of first antenna module 197-1 & beam identifier of second antenna module 197-2) | beam angle (θ) | Note |
| --- | --- | --- | --- |
| 10 mm | #42 & #24 | 50° | Co-polarized wave (H pole) |
|  | #156 & #152 | 50° | Co-polarized wave (V pole) |
| 15 mm | #41 & #25 | 62° | Co-polarized wave (H pole) |
|  | #167 & 170 | 65° | Co-polarized wave (V pole) |
| 20 mm | #25 & #40 | 70° | Co-polarized wave (H pole) |
|  | #168 & #169 | 72° | Co-polarized wave (V pole) |

The electronic device 101 of an embodiment may control the first antenna module 197-1 and the second antenna module 197-2, based on the above-described pair of beam identifiers. For example, the electronic device 101 may sequentially control the first antenna module 197-1 and the second antenna module 197-2, from a pair of beam identifiers corresponding to a near distance (e.g., #42 & #24 corresponding to 10 mm) to a pair of beam identifiers corresponding to a far distance (e.g., #25 & #40 corresponding to 20 mm). When the reception gain of the received second radio signal and/or the antenna gain of the second antenna module 197-2 satisfy a specified condition or exceed a specified threshold in a specific pair of beam identifiers, the electronic device 101 may determine the distance between the external object and the electronic device 101, as a distance corresponding to a specific beam identifier.

According to an embodiment, the distance between the identified external object and the electronic device 101, for example, may be used to perform various operations related to the electronic device such as operation 340 of FIG. 3. For example, the electronic device 101 may display a UI corresponding to the distance or may change the UI according to the distance. For example, the electronic device 101 may adjust a beam used to communicate with a wireless communication network, based on the distance, or perform switching between a plurality of APs of the wireless communication network. The switching may include hand-over between a plurality of APs (e.g., a plurality of APs of a 5G network, a first AP of a 5G network, and a second AP of an LTE network). As the electronic device 101 of various embodiments detects the external object by using one or more antenna modules such as the first antenna module 197-1 and the second antenna module 197-2, the electronic device 101 may detect the external object in a greater range than that of when using a proximity sensor, a grip sensor, and/or an illuminance sensor.

Figure 11:
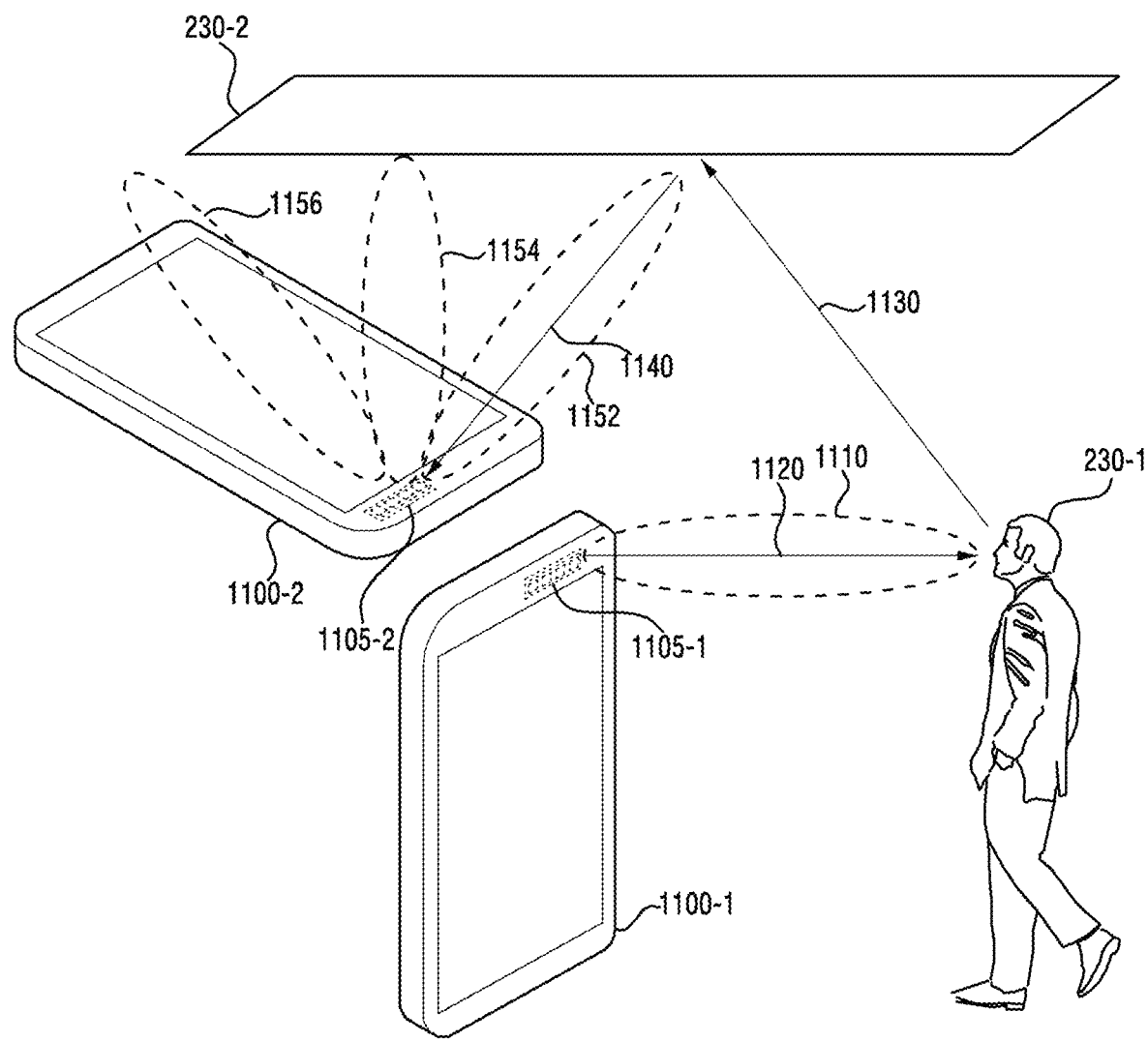
FIG. 11 illustrates an exemplary diagram for explaining an operation in which a plurality of electronic devices identify external objects according to various embodiments of the present disclosure.

FIG. 11 illustrates an exemplary diagram for explaining an operation in which a plurality of electronic devices 1100-1 and 1100-2 identify external objects 230-1 and 230-2 according to various embodiments of the present disclosure. The plurality of electronic devices 1100-1 and 1100-2 of FIG. 11 may correspond to the electronic device 101 of FIG. 1 to FIG. 2. For example, the plurality of electronic devices 1100-1 and 1100-2 may be terminals carried by a user, or may include an access point installed in an indoor environment. The plurality of electronic devices 1100-1 and 1100-2 may support wireless communication that is based on a millimeter wave.

In an embodiment, the plurality of electronic devices 1100-1 and 1100-2 may communicate with each other, based on short-range communication. For example, the plurality of electronic devices 1100-1 and 1100-2 may be synchronized, based on short-range communication. The synchronization may include operating in operation modes (e.g., a transmission mode for a radio signal and/or a reception mode for the radio signal) that are different from each other in a specific time section and/or a specific moment. For example, while the first electronic device 1100-1 operates based on a transmission mode of transmitting a first radio signal 1120 for detecting the external object 230-1, the second electronic device 1100-2 may operate based on a reception mode of receiving a second radio signal 1140 corresponding to a reflected signal of the first radio signal 1120. The synchronization may include sharing a result in which the plurality of electronic devices 1100-1 and 1100-2 operate in operation modes different from each other.

In an embodiment, the plurality of electronic devices 1100-1 and 1100-2 may communicate with each other, based on a directional electromagnetic wave, such as a millimeter wave. Referring to FIG. 11, an antenna module 1105-1 included in the first electronic device 1100-1 and an antenna module 1105-2 included in the second electronic device 1100-2 are illustrated. The antenna modules 1105-1 and 1105-2 may correspond to the first antenna module 197-1 of FIG. 2 and/or FIG. 4A.

Referring to FIG. 11, the first electronic device 1100-1 may control the antenna module 1105-1, to transmit the first radio signal 1120 through a first beam 1110. For example, the first radio signal 1120 may have a frequency included in a millimeter wave band. The first radio signal 1120 may reach the first external object 230-1 adjacent to the first electronic device 1100-1. The first external object 230-1 may correspond to, for example, a user.

The first radio signal 1120 reaching the user may be reflected in one or more directions different from an incidence direction. Referring to FIG. 11, for example, a part of the first radio signal 1120 may be reflected in a direction 1130 different from the incidence direction. The first radio signal 1120 reflected along the direction 1130 may reach the second external object 230-2 that is different from the first external object 230-1. The second external object 230-2, for example, may mean a wall surface of a building, such as a ceiling.

According to an embodiment, while the first electronic device 1100-1 transmits the first radio signal 1120 toward the first external object 230-1, the second electronic device 1100-2 may control the antenna module 1105-2, to receive the second radio signal 1140 corresponding to the reflected signal of the first radio signal 1120. For example, the second electronic device 1100-2 may receive the second radio signal 1140 by using at least one of a plurality of beams 1152, 1154, and 1156 formed using the antenna module 1105-2. The second electronic device 1100-2 may identify the beam 1152 in which a gain of the second radio signal 1140 is largest. A direction of the beam 1152 may correspond to a direction of the second radio signal 1140 reaching the second antenna module 1105-2.

In an embodiment, an operation in which the first electronic device 1100-1 transmits the first radio signal 1120 through the antenna module 1105-1 may be carried out similarly to an operation in which the electronic device 101 of FIG. 6 transmits the first radio signal 620 through the first antenna module 197-1. In an embodiment, an operation in which the second electronic device 1100-2 receives the second radio signal 1140 through the antenna module 1105-2 may be performed similarly to an operation in which the electronic device 101 of FIG. 6 receives the second radio signal 640 through the second antenna module 197-2. According to an embodiment, in response to the identification of the beam 1152 and/or the second radio signal 1140, the second electronic device 1100-2 may determine whether the plurality of electronic devices 1100-1 and 1100-2 are located indoors and/or whether the first external object 230-1 is adjacent to the first electronic device 1100-1. Hereinafter, an operation in which the plurality of electronic devices 1100-1 and 1100-2 communicate with each other and identify the first external object 230-1 will be described with reference to FIG. 12.

Figure 12:
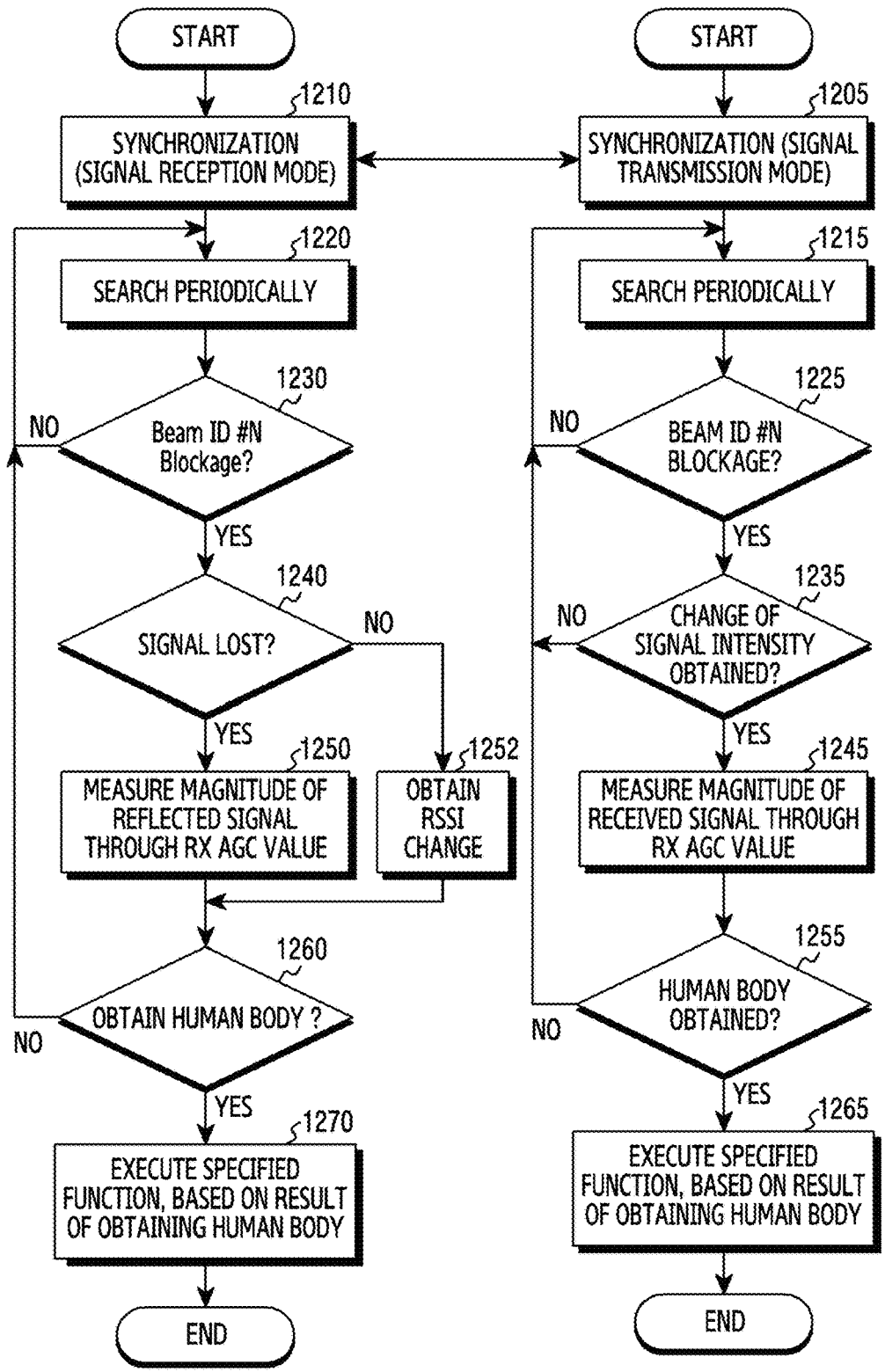
FIG. 12 illustrates a flowchart for explaining an operation performed by a plurality of electronic devices according to various embodiments of the present disclosure.

FIG. 12 illustrates a flowchart for explaining an operation performed by a plurality of electronic devices 1100-1 and 1100-2 according to various embodiments of the present disclosure. The plurality of electronic devices 1100-1 and 1100-2 of FIG. 12 may correspond to the electronic device 101 of FIG. 1 to FIG. 2. The plurality of electronic devices 1100-1 and 1100-2 of FIG. 12 may correspond to the plurality of electronic devices 1100-1 and 1100-2 of FIG. 11, respectively.

Referring to FIG. 12, in operations 1205 and 1210, the plurality of electronic devices 1100-1 and 1100-2 may be synchronized with each other. The synchronization of the plurality of electronic devices 1100-1 and 1100-2 may include, for example, an operation in which the plurality of electronic devices 1100-1 and 1100-2 each enter operation modes different from each other. For example, the first electronic device 1100-1 may enter a signal transmission mode of transmitting a radio signal for detecting an external object (e.g., the first external object 230-1 of FIG. 11). For example, the second electronic device 1100-2 may enter a signal reception mode of receiving a reflected signal of the radio signal for detecting the external object. A time section and/or a time period during which the first electronic device 1100-1 operates in the signal transmission mode may coincide with a time section and/or a time period during which the second electronic device 1100-2 operates in the signal reception mode.

According to various embodiments of the present disclosure, the synchronization operation may be possible any time in course of performing mmWave communication, and the synchronization operation may also be performed using another communication method having a less possibility of causing the blockage of a signal due to an object, in addition to the mmWave communication. For example, the synchronization operation between the plurality of electronic devices 1100-1 and 1100-2 may be performed using a communication scheme such as Bluetooth, WiFi, or LTE. As another example, ID information of a beam used for an operation for detecting an object during the synchronization operation may be exchanged between the plurality of electronic devices 1100-1 and 1100-2.

According to various embodiments of the present disclosure, when the first electronic device 1100-1 is an AP or a small base station, and the second electronic device 1100-2 is a terminal, the first electronic device 1100-1 and the second electronic device 1100-2 may detect, without the synchronization operation, the external object, based on a signal transmitted from the counterpart in a partial section of the communication. In this case, the synchronization operations 1205 and 1210 may be omitted.

Referring to FIG. 12, in operations 1215 and 1220, the plurality of electronic devices 1100-1 and 1100-2 may perform an operation of searching for the external object, based on a specified period. In operations 1225 and 1230, the plurality of electronic devices 1100-1 and 1100-2 may identify an identifier of a blocked beam. For example, when there are one or more external objects adjacent to the plurality of electronic devices 1100-1 and 1100-2 such as the external objects 230-1 and 230-2 of FIG. 11, a radio signal being based on a specific beam (e.g., a beam whose beam identifier is N) may be blocked by the external object. When the blocked beam does not exist (1225—No, 1230—No), the plurality of electronic devices 1100-1 and 1100-2 may perform an operation of searching for the external object, based on operations 1215 and 1220.

When the blocked beam exists (1225—Yes), in operation 1235, the first electronic device 1100-1 may obtain a change of a strength of a radio signal, based on the blocked beam. When the strength of the radio signal does not change (1235—No), the first electronic device 1100-1 may perform the operation of searching for an external object, based on operation 1215. When the strength of the radio signal changes (1235—Yes), in operation 1245, the first electronic device 1100-1 may measure a magnitude of the radio signal, based on an antenna gain (e.g., Rx AGC) corresponding to the changed radio signal. In operation 1255, the first electronic device 1100-1 may determine whether a human body (e.g., the first external object 230-1 of FIG. 11) has been obtained, based on the measured size of the radio signal. When the human body has not been obtained (1255—No), the first electronic device 1100-1 may perform the operation of searching for an external object, based on operation 1215.

When the blocked beam exists (1230—Yes), in operation 1240, the second electronic device 1100-2 may determine whether a radio signal being based on the blocked beam has been lost. When the radio signal based on the blocked beam has been lost (1240—Yes), in operation 1250, the second electronic device 1100-2 may measure a magnitude of the radio signal (e.g., the reflected signal reflected from the external object), based on an antenna gain corresponding to the lost radio signal. When the radio signal based on the blocked beam has not been lost (1240—NO), in operation 1252, the second electronic device 1100-2 may obtain a change of a received signal strength indicator (RSSI) of the radio signal.

In operation 1260, the second electronic device 1100-2 may determine whether a human body (e.g., the external object 230-1 of FIG. 11) has been obtained, based on at least one of the magnitude of the radio signal measured in operation 1250 and the change of the RSSI obtained in operation 1252. When the human body has not been obtained (1260—No), the second electronic device 1100-2 may perform an operation of searching for an external object, based on operation 1220.

When the human body has been obtained (1255—Yes, 1260—Yes), in operations 1265 and 1270, the plurality of electronic devices 1100-1 and 1100-2 may execute a specified function, based on the result of obtaining the human body. In an embodiment, the plurality of electronic devices 1100-1 and 1100-2 may perform operations 1265 and 1270 similarly to operation 340 of FIG. 3. For example, at least one of the plurality of electronic devices 1100-1 and 1100-2 may display a UI that is based on the obtained human body. In an embodiment, in response to the identification of the human body, at least one of the plurality of electronic devices 1100-1 and 1100-2 may adjust a beam used to communicate with a wireless communication network.

Figure 13:
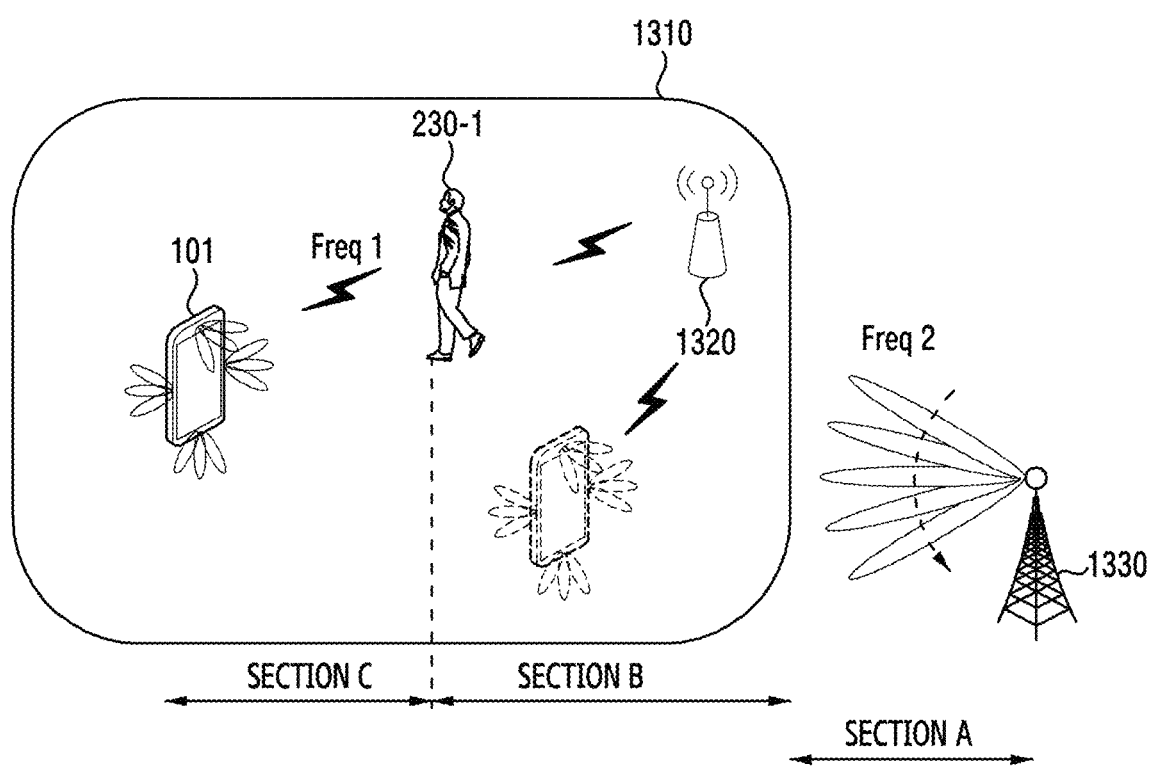
FIG. 13 illustrates an exemplary diagram for explaining an operation in which an electronic device communicates with at least one of a plurality of base stations according to various embodiments of the present disclosure.

FIG. 13 illustrates an exemplary diagram for explaining an operation in which the electronic device 101 communicates with at least one of a plurality of base stations 1320 and 1330 according to various embodiments of the present disclosure. The electronic device 101 of FIG. 13 may correspond to the electronic device 101 of FIG. 1 to FIG. 2.

Referring to FIG. 13, the electronic device 101 of various embodiments may communicate with one or more nearby base stations (e.g., the first base station 1320 and/or the second base station 1330). For example, the first base station 1320 may be installed in an indoor environment 1310. For example, the second base station 1330 may be installed in an outdoor environment different from an indoor environment 1310. That the electronic device 101 communicates with one or more base stations may be performed, for example, based on a radio signal having a frequency (e.g., Freq1 and/or Freq2) included in a directional millimeter wave band. When the first external object 230-1 such as a user exists between the electronic device 101 and the base station (e.g., the first base station 1320 or the second base station 1330), the radio signal of the directional millimeter wave band may be blocked and/or attenuated.

According to an embodiment, the electronic device 101 may identify the first external object 230-1 existing between the electronic device 101 and the base station (e.g., the first base station 1320 or the second base station 1330), based on the blocking and/or attenuation of the radio signal. When the electronic device 101 simultaneously communicates with the plurality of base stations such as the first base station 1320 and the second base station 1330, the electronic device 101 of an embodiment may identify the first external object 230-1, based on the strengths of a plurality of radio signals each corresponding to the plurality of base stations.

In an embodiment, the electronic device 101 may determine whether the electronic device 101 is included in the indoor environment 1310, based on the attenuation of a first radio signal corresponding to the first base station 1320 and/or the attenuation of a second radio signal corresponding to the second base station 1330. For example, as the electronic device 101 is moved to the indoor environment 1310 by the user, the second radio signal corresponding to the second base station 1330 received by the electronic device 101 may be attenuated. In response to the identification of the attenuation of the second radio signal, the electronic device 101 may determine that the electronic device 101 has entered the indoor environment 1310.

In an embodiment, the electronic device 101 may compare the degree of attenuation of the first radio signal and the degree of attenuation of the second radio signal, and determine whether the electronic device 101 has entered the indoor environment 1310. For example, as the electronic device 101 is moved to the indoor environment 1310 by the user, a magnitude of the second radio signal corresponding to the second base station 1330 received by the electronic device 101 may decrease, and a magnitude of the first radio signal corresponding to the first base station 1320 received by the electronic device 101 may increase. In response to the identification of the attenuated second radio signal and the increased first radio signal, the electronic device 101 may determine that the electronic device 101 has entered the indoor environment 1310.

In an embodiment, when the electronic device 101 exists in the indoor environment 1310, the electronic device 101 may identify a location of the electronic device 101 in the indoor environment 1310, based on the strength of the signal reflected by the external object 230-1. For example, the electronic device 101 may identify whether the electronic device 101 exists in any one of Section B or Section C.

For example, when the electronic device 101 is located in Section B and communicates with the first base station 1320 without an obstacle (e.g., the first external object 230-1), the electronic device 101 may simultaneously receive the first radio signal corresponding to the first base station 1320 and a reflected signal of the first radio signal reflected from the first external object 230-1. In this case, the electronic device 101 may distinguish the first radio signal directly received from the first base station 1320 and the reflected signal, thereby determining that the electronic device 101 is located in Section B of the indoor environment 1310.

For example, when the electronic device 101 is located in Section C and an obstacle (e.g., the first external object 230-1) exists between the electronic device 101 and the first base station 1320, the electronic device 101 may receive a reflected signal of the first radio signal reflected from the first external object 230-1. In this case, the electronic device 101 may determine that the electronic device 101 is located in Section C of the indoor environment 1310, based on the received reflected signal.

Figure 14:
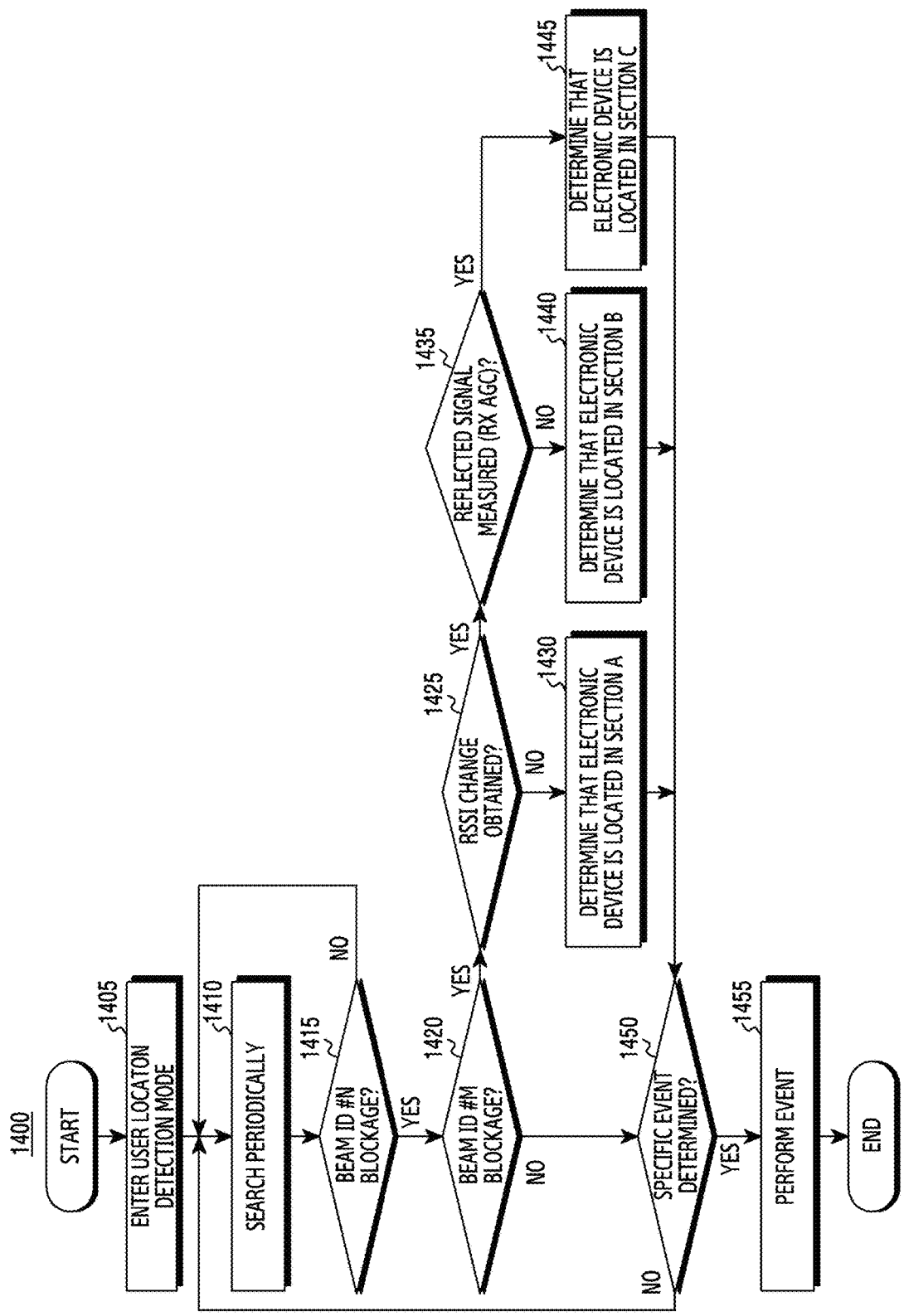
FIG. 14 illustrates a flowchart for explaining an operation performed by an electronic device according to various embodiments of the present disclosure.

FIG. 14 illustrates a flowchart 1400 for explaining an operation performed by the electronic device 101 according to various embodiments of the present disclosure. The electronic device 101 of FIG. 14 may correspond to the electronic device 101 of FIG. 1 to FIG. 2 to the electronic device 101 of FIG. 13.

Referring to FIG. 14, in operation 1405, the electronic device 101 of various embodiments may enter a specified operation mode (e.g., a user location detection mode) for detecting a user's location. For example, the electronic device 101 may enter an operation mode for detecting an external object (e.g., the external object 230-1 of FIG. 12) similarly to operations 1205 and 1210 of FIG. 12.

Referring to FIG. 14, in operation 1410, the electronic device 101 of various embodiments may perform an operation of searching for an external object, based on a specified period. In operation 1415, the electronic device 101 of various embodiments may identify an identifier of a blocked beam. The electronic device 101 may perform operations 1410 and 1415 similarly to operations 1215, 1220, 1225, and 1230 of FIG. 12. When the blocked beam does not exist (1415—No), the electronic device 101 of an embodiment may perform the operation of periodically searching for an external object according to operation 1410.

When the blocked beam (e.g., beam ID #N) exists (1415—Yes), in operation 1420, the electronic device 101 of various embodiments may additionally determine whether another beam is blocked in order to increase the reliability of blocking. In an embodiment, the electronic device 101 may check whether even another beam ID (e.g., beam ID #M) within the same or similar range is blocked, or may again verify whether beam ID #N or beam ID #M is blocked even in another antenna array or another antenna module, to increase the reliability of blocking.

When even another beam ID has been blocked (1420—Yes), in operation 1425, the electronic device 101 of various embodiments may obtain an RSSI change of a radio signal. For example, the electronic device 101 may obtain an RSSI change of a radio signal received from the second base station 1330 that is located outdoors and is different from the indoor environment 1310 of FIG. 13.

When the RSSI change has not been obtained (1425—NO), in operation 1430, the electronic device 101 of various embodiments may determine that the electronic device 101 is located outdoors as in Section A of FIG. 13.

When the RSSI change has been obtained (1425—Yes), in operation 1435, the electronic device 101 of various embodiments may measure a reflected signal. The reflected signal is based on a radio signal radiated from the first base station 1330 and/or the electronic device 101 of FIG. 13, and may mean a reflected signal reflected by the first external object 230-1. For example, the measuring of the reflected signal may include measuring a reception antenna gain (RX AGC).

When the reflected signal has not been measured (1435—NO), in operation 1440, the electronic device 101 of various embodiments may determine that the electronic device 101 is located in Section B of FIG. 13 in which no obstacle (e.g., the first external object 230-1 of FIG. 13) exists between the electronic device 101 and the base station (e.g., the first base station 1320 of FIG. 13).

When the reflected signal has been measured (1435—Yes), in operation 1445, the electronic device 101 of various embodiments may determine that the electronic device 101 is located in Section C of FIG. 13 in which an obstacle (e.g., the first external object 230-1 of FIG. 13) exists between the electronic device 101 and the base station.

Referring to FIG. 14, in operation 1450, the electronic device 101 of various embodiments may determine an event related to the location of the electronic device 101, based on the result of determining the identified location (e.g., Section A, Section B, or Section C of FIG. 13) of the electronic device 101. When the determined event does not exist (1450—No), the electronic device 101 of an embodiment may perform the operation of searching for an external object as in operation 1410.

When the determined event exists (1450—Yes), in operation 1455, the electronic device 101 of various embodiments may perform the determined event. The electronic device 101 of an embodiment may perform operation 1455 similarly to operation 340 of FIG. 3. For example, the electronic device 101 may display a UI being based on the obtained external object. For example, in response to obtaining the external object, the electronic device 101 may adjust a beam used to communicate with a wireless communication network.

Hereinafter, an operation of identifying the first external object 230-1 in further consideration of a form of the electronic device 101 when the electronic device 101 is a foldable electronic device including a housing deformable by an external force will be described with reference to FIG. 15 to FIG. 18.

Figure 15:
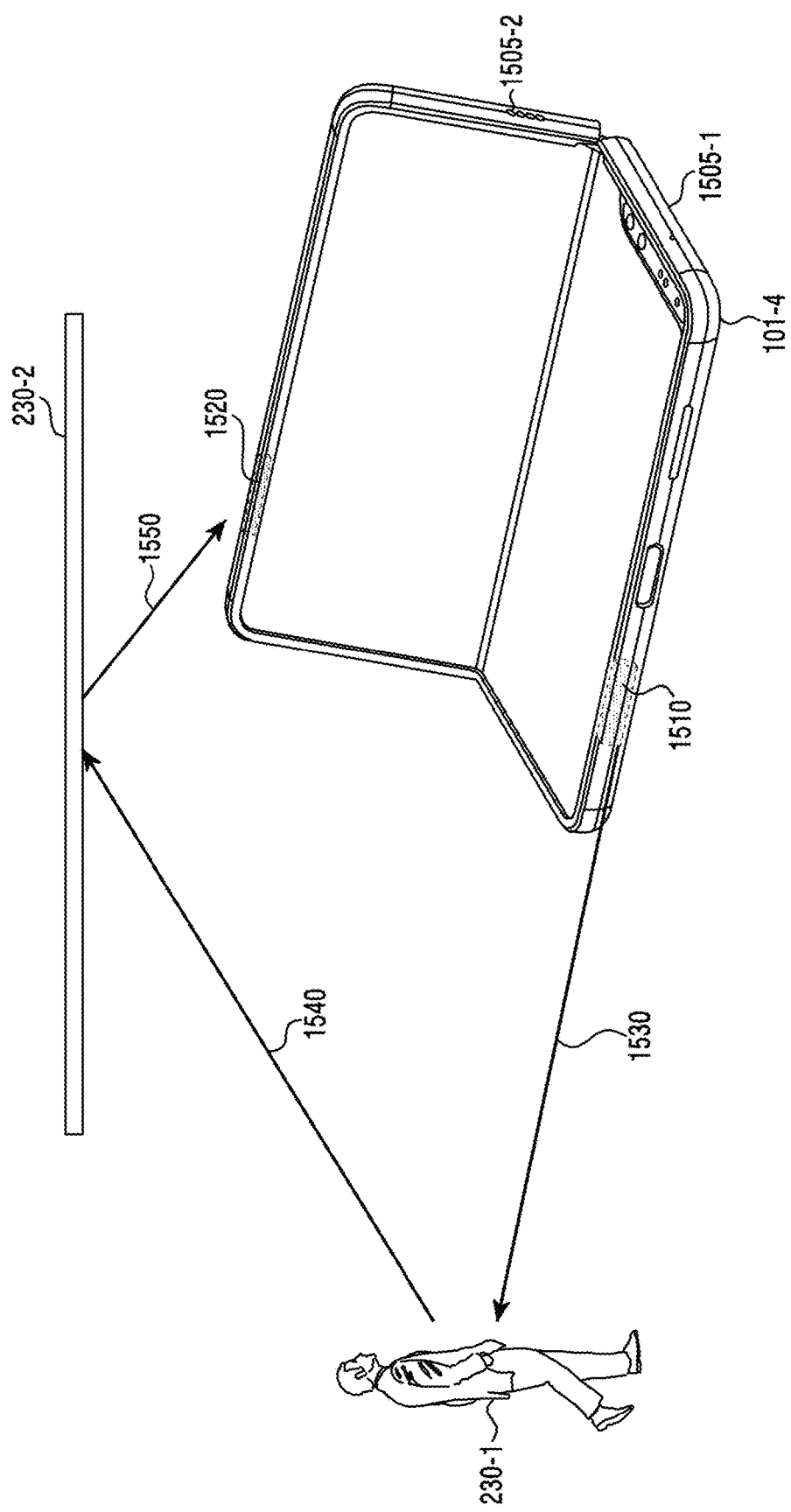
FIG. 15 illustrates an exemplary diagram for explaining an operation in which an electronic device detects an external object according to an embodiment of the present disclosure.

FIG. 15 illustrates an exemplary diagram for explaining an operation in which the electronic device 101-4 detects the first external object 230-1 according to an embodiment. The electronic device 101-4 of FIG. 15 may be related to the electronic device 101 of FIG. 1 to FIG. 2. The electronic device 101-4 of an embodiment may include a flexible display. The electronic device 101-4 may include a plurality of housings connected by one or more hinges making possible the bending, folding, and/or rolling of the flexible display. FIG. 15 illustrates an embodiment of the electronic device 101-4 having the plurality of housings (e.g., a first housing 1505-1 and a second housing 1505-2) connected by the hinge disposed along a center axis of the flexible display.

Referring to FIG. 15, the electronic device 101-4 of an embodiment may include antenna modules (e.g., a first antenna module 1510 and a second antenna module 1520). The antenna modules 1510 and 1520 may correspond to at least one of the antenna modules 197-1, 197-2 and 197-3 of FIG. 2. The antenna modules 1510 and 1520 may be disposed in an internal space of the electronic device 101-4 distinguished by the housing. For example, the first antenna module 1510 may be disposed in the first housing 1505-1 of the electronic device 101-4, and the second antenna module 1520 may be disposed in the second housing 1505-2 of the electronic device 101-4.

The electronic device 101-4 of an embodiment may form a beam directed in a specific direction by using the first antenna module 1505-1. The electronic device 101-4 may radiate a first radio signal 1530 through the first antenna module 1510, based on the formed beam. While radiating the first radio signal 1530, the electronic device 101-4 may control the second antenna module 1520 to search for a reflected signal of the first radio signal 1530. For example, when the first external object 230-1 such as a user exists adjacent to the electronic device 101-4, the first radio signal 1530 may be reflected by the first external object 230-1. For example, the reflected signal of the first radio signal 1530 reflected from the first external object 230-1 may be radiated in a direction 1540 and then be reflected by the second external object 230-2 and radiated toward the antenna module 1520. For example, a second radio signal 1550 may mean the reflected signal of the first radio signal 1530 reflected by the second external object 230-2 and radiated toward the second antenna module 1520.

The electronic device 101-4 of an embodiment may control the second antenna module 1520 to receive the second radio signal 1550 corresponding to the reflected signal of the first radio signal 1530. The second radio signal 1550 may be received based on any one of a plurality of beams formable by the second antenna module 1520. The electronic device 101-4 may identify a beam in which a gain of the second radio signal 1550 is largest, from among the plurality of beams formable by the second antenna module 1520. A direction of the identified beam may correspond to a direction of the second radio signal 1550 reaching the second antenna module 1520.

In response to the second radio signal 1550 and the identification of the beam, the electronic device 101-4 of an embodiment may determine whether the electronic device 101-4 is located indoors and/or whether the first external object 230-1 is adjacent to the electronic device 101-4. Hereinafter, an operation of determining whether the electronic device 101-4 is located indoors based on the first antenna module 1510 and the second antenna module 1520 and/or whether the first external object 230-1 is adjacent to the electronic device 101-4 will be described with reference to FIG. 16.

Figure 16:
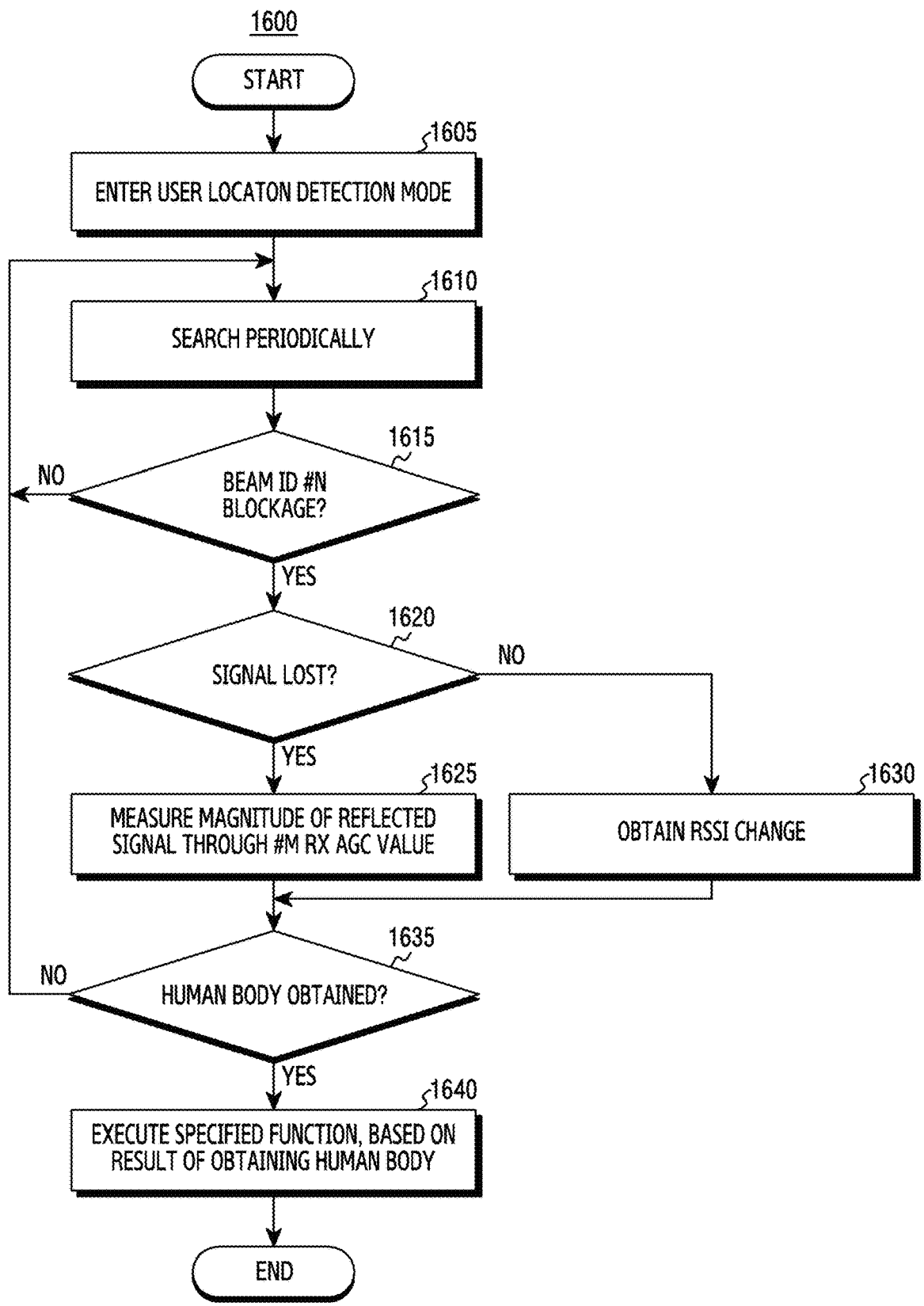
FIG. 16 illustrates a flowchart for explaining an operation performed by an electronic device according to various embodiments of the present disclosure.

FIG. 16 illustrates a flowchart 1600 illustrating an operation performed by the electronic device 101-4 according to various embodiments of the present disclosure. The electronic device 101-4 of FIG. 16 may correspond to the electronic device 101-4 of FIG. 15. For example, at least one of the operations of FIG. 16 may be performed by the electronic device 101-4 of FIG. 15.

Referring to FIG. 16, in operation 1605, the electronic device 101-4 of an embodiment may enter a specified operation mode (e.g., a user location detection mode) for detecting a user's location. For example, the electronic device 101-4 may perform operation 1605 similarly to operation 1405 of FIG. 14. Upon entering the specified operation mode, the electronic device 101-4 may perform at least one operation for detecting an external object (e.g., the external objects 230-1 and 230-2 of FIG. 15).

Referring to FIG. 16, in operation 1610, the electronic device 101-4 of an embodiment may perform an operation of searching for an external object, based on a specified period. In operation 1615, the electronic device 101-4 of an embodiment may identify an identifier of a blocked beam. The electronic device 101-4 may perform operations 1610 and 1615 similarly to operations 1410 and 1415 of FIG. 14. When the blocked beam does not exist (1615—No), the electronic device 101-4 of an embodiment may perform the operation of detecting an external object, based on operation 1610.

When the blocked beam exists (1615—Yes), in operation 1620, the electronic device 101-4 of an embodiment may determine whether a radio signal being based on the blocked beam has been lost. The electronic device 101-4 of an embodiment may perform operation 1620 similarly to operation 1240 of FIG. 12. When the radio signal being based on the blocked beam has been lost (1620—Yes), in operation 1625, the electronic device 101-4 of an embodiment may measure a magnitude of a reflected signal (e.g., the second radio signal 1550 of FIG. 15) corresponding to the lost radio signal. For example, the electronic device 101-4 may measure the magnitude of the reflected signal, based on a reception antenna gain (e.g., #M RX AGC) in the beam identifier corresponding to the reflected signal. When the radio signal being based on the blocked beam has not been lost (1620—NO), in operation 1630, the electronic device 101-4 of an embodiment may detect a change of an RSSI of the radio signal. The electronic device 101-4 of an embodiment may perform operation 1630 similarly to operation 1252 of FIG. 12.

Referring to FIG. 16, in operation 1635, the electronic device 101-4 of an embodiment may determine whether a human body (e.g., the first external object 230-1 of FIG. 15) is detected, based on at least one of the magnitude of the reflected signal measured according to operation 1625 or the change of the RSSI of the radio signal obtained according to operation 1630. When the human body has not been obtained (1635—NO), the electronic device 101-4 may perform an operation of detecting an external object, based on operation 1610.

When the human body has been obtained (1635—Yes), in operation 1640, the electronic device 101-4 of an embodiment may execute a specified function, based on the result of obtaining the human body. The electronic device 101-4 of an embodiment may perform operation 1640 similarly to operation 340 of FIG. 3. For example, the electronic device 101-4 may display a UI being based on the obtained human body. For example, the electronic device 101-4 may form a beam in a direction not blocked by the human body, and communicate with another electronic device and/or a base station.

Figure 17:
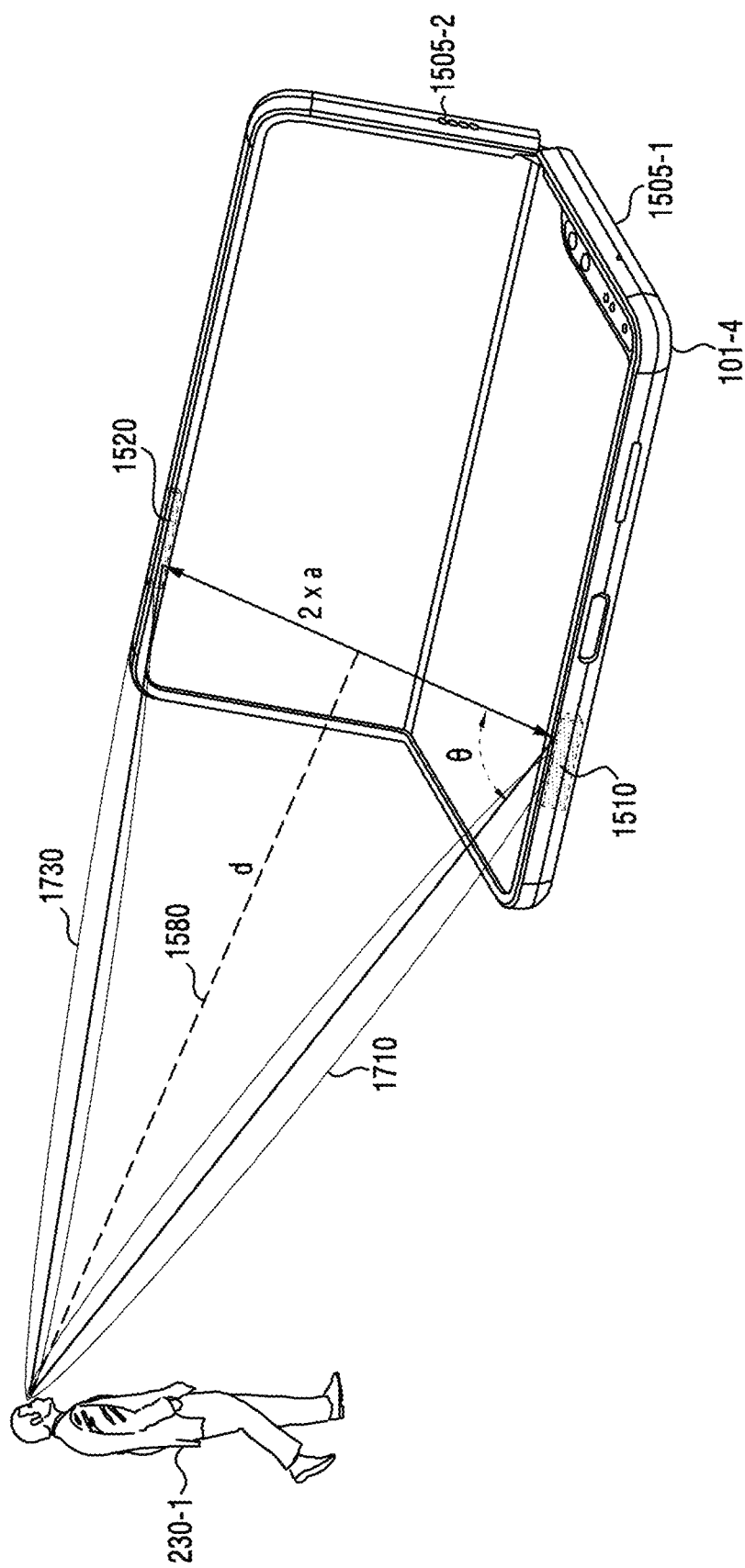
FIG. 17 illustrates an exemplary diagram for explaining an operation in which an electronic device detects an external object according to an embodiment of the present disclosure.

FIG. 17 illustrates an exemplary diagram for explaining an operation in which the electronic device 101-4 detects an external object 230-1 according to an embodiment. The electronic device 101-4 of FIG. 17 may be related to the electronic device 101 of FIG. 1 to FIG. 2. The electronic device 101-4 of FIG. 17 may correspond to the electronic device 101-4 of FIG. 15. For example, one or more constituent elements (e.g., a first antenna module 1510, a second antenna module 1520, a first housing 1505-1 and a second housing 1505-2) included in the electronic device 101-4 of FIG. 17 may coincide with the constituent elements included in the electronic device 101-4 of FIG. 15.

According to an embodiment, the electronic device 101-4 may identify the external object 230-1 in further consideration of even a form of the electronic device 101-4 deformed by an external force. Referring to FIG. 17, as the first housing 1505-1 and the second housing 1505-2 are folded centering on a hinge, a distance between the first antenna module 1510 and the second antenna module 1520 may be changed to (2×a). The electronic device 101-4 of an embodiment may include a hardware component capable of detecting the form of the electronic device 101-4, such as a bending sensor. For example, the electronic device 101-4 may identify the distance (2×a) between the first antenna module 1510 and the second antenna module 1520, based on the bending sensor.

The electronic device 101-4 of an embodiment may form a beam 1710 in a specified direction by using the first antenna module 1510, and transmit a first radio signal, based on the formed beam 1710. When the first radio signal is reflected by the first external object 230-1, the electronic device 101-4 may receive a second radio signal that is a reflected signal of the first radio signal, by using the second antenna module 1520. For example, the electronic device 101-4 may receive the second radio signal, based on a beam 1730 formed in a direction different from the beam 1710 corresponding to the first radio signal.

The electronic device 101-4 of an embodiment may identify an angle (θ) formed between the beam and an axis connecting the first antenna module 1510 and the second antenna module 1520, based on the beam 1710 related to the transmission of the first radio signal and the beam 1730 related to the reception of the second radio signal. The electronic device 101-4 of an embodiment may acquire a distance (d) between the axis and the first external object 230-1, based on the identified angle (θ) and the distance (2×a) between the first antenna module 1510 and the second antenna module 1520. For example, the (d) may be (a×tan θ). The electronic device 101-4 may determine a distance between the first external object 230-1 and the electronic device 101-4 and/or whether the external object 230-1 exists, based on the acquired (d). Hereinafter, operations performed by the electronic device 101-4 of FIG. 17 will be described with reference to FIG. 18.

Figure 18:
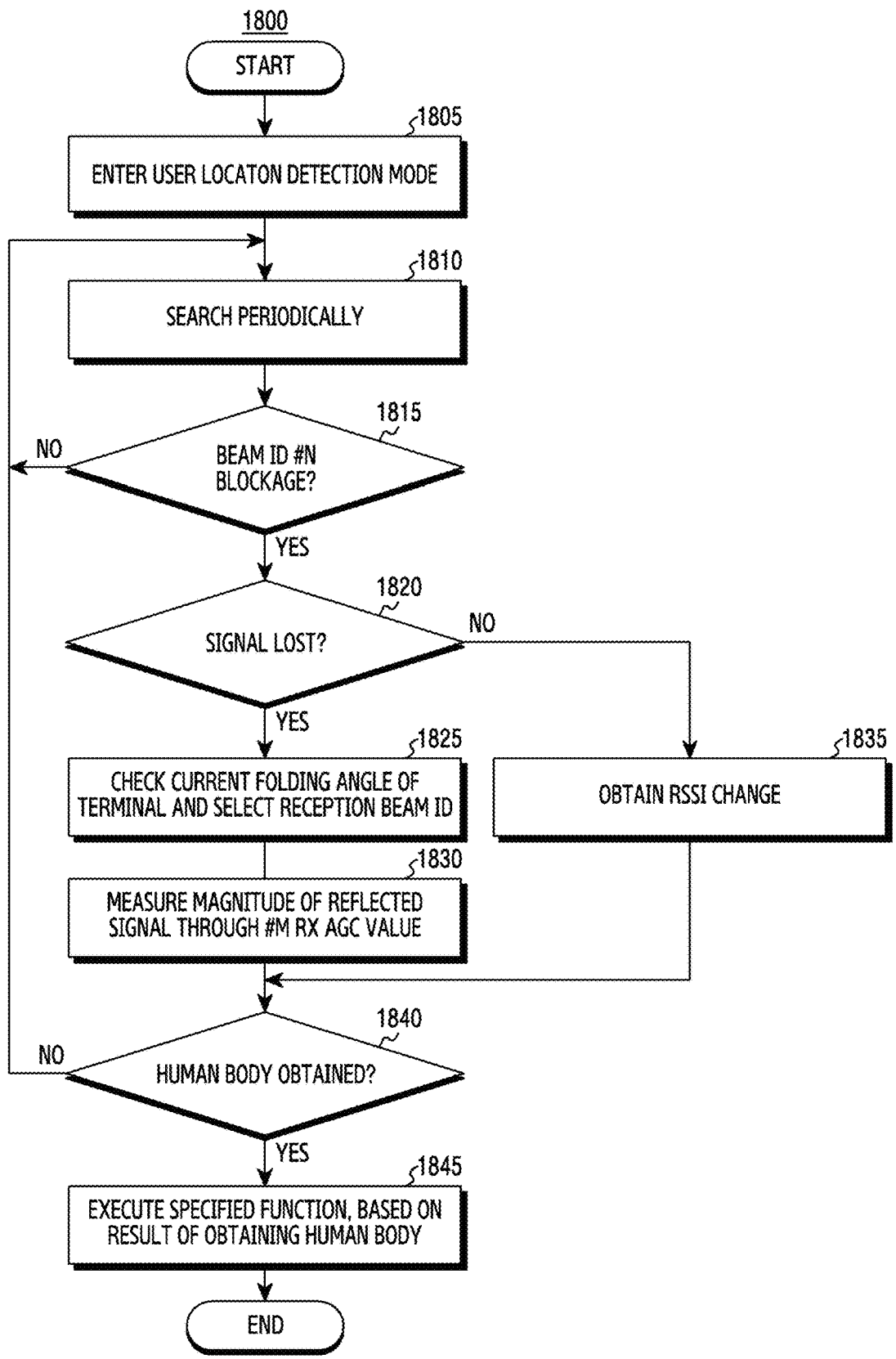
FIG. 18 illustrates a flowchart for explaining an operation performed by an electronic device according to an embodiment of the present disclosure.

FIG. 18 illustrates a flowchart 1800 for explaining an operation performed by the electronic device 101-4 according to an embodiment of the present disclosure. The electronic device 101-4 of FIG. 18 may correspond to the electronic device 101-4 of FIG. 17. For example, at least one of operations of FIG. 18 may be performed by the electronic device 101-4 of FIG. 17.

Referring to FIG. 18, in operation 1805, the electronic device 101-4 of an embodiment may enter a specified operation mode (e.g., a user location detection mode) for detecting a user's location. For example, the electronic device 101-4 may perform operation 1805 similarly to operation 1405 of FIG. 14 and/or operation 1605 of FIG. 16. As entering the specified operation mode, the electronic device 101-4 may perform at least one operation for detecting an external object (e.g., the first external object 230-1 of FIG. 17).

Referring to FIG. 18, in operation 1810, the electronic device 101-4 of an embodiment may perform an operation of searching for an external object, based on a specified period. In operation 1815, the electronic device 101-4 of an embodiment may identify an identifier of a blocked beam. The electronic device 101-4 may perform operations 1805 and 1810 similarly to operations 1410 and 1415 of FIG. 14 and/or operations 1610 and 1615 of FIG. 16. When the blocked beam does not exist (1815—No), the electronic device 101-4 of an embodiment may perform the operation of searching for an external object, based on operation 1810.

If the blocked beam exists (1815—Yes), in operation 1820, the electronic device 101-4 of an embodiment may determine whether a radio signal being based on the blocked beam has been lost. The electronic device 101-4 of an embodiment may perform operation 1820 similarly to operation 1240 of FIG. 12 and/or operation 1620 of FIG. 16. When the radio signal being based on the blocked beam has not been lost (1820—No), in operation 1835, the electronic device 101-4 of an embodiment may obtain a change of an RSSI of the radio signal. The electronic device 101-4 of an embodiment may perform operation 1835 similarly to operation 1252 of FIG. 12 and/or operation 1630 of FIG. 16.

When the radio signal being based on the blocked beam has been lost (1820—Yes), in operation 1825, the electronic device 101-4 of an embodiment may identify a folding angle (e.g., an angle formed by the first housing 1505-1 and the second housing 1505-2 of FIG. 17) of the electronic device 101-4. The electronic device 101-4 of an embodiment may identify a beam identifier of a reflected signal (e.g., the beam identifier of the reflected signal received by the second antenna module 1520 of FIG. 17). In operation 1830, the electronic device 101-4 of an embodiment may measure a magnitude of the reflected signal (e.g., the radio signal received by the second antenna module 1520 of FIG. 17) corresponding to the lost radio signal. For example, the electronic device 101-4 may measure the magnitude of the reflected signal, based on a reception antenna gain (e.g., #M RX AGC) in a beam identifier corresponding to the reflected signal.

Referring to FIG. 18, in operation 1840, the electronic device 101-4 of an embodiment may determine whether a human body (e.g., the external object 230-1 of FIG. 17) has been obtained, based on at least one of the magnitude of the reflected signal measured in operation 1830, the folding angle of the electronic device 101-4, and/or the change of the RSSI of the radio signal obtained according to operation 1835. When the human body has not been obtained (1840—NO), the electronic device 101-4 of an embodiment may perform an operation of searching for an external object, based on operation 1810.

When the human body has been obtained (1840—Yes), in operation 1845, the electronic device 101-4 of an embodiment may execute a specified function, based on the result of obtaining the human body. The electronic device 101-4 of an embodiment may perform operation 1845 similarly to operation 340 of FIG. 3. For example, the electronic device 101-4 may display a UI that is based on the obtained human body. For example, the electronic device 101-4 may form a beam in a direction not blocked by the human body, and communicate with another electronic device and/or a base station.

As described above, an electronic device (e.g., the electronic device 101 of FIG. 1 to FIG. 2) of various embodiments may include a plurality of antenna arrays (e.g., the first antenna array 211 or the second antenna array 212 of FIG. 2), and at least one processor (e.g., the processor 120 of FIG. 1 or FIG. 2) operatively connected to the plurality of antenna arrays. The at least one processor may transmit a first radio signal (e.g., the first radio signal 620 of FIG. 6) having a specified polarized wave by using a first antenna array (e.g., the first antenna array 211 of FIG. 2) among the plurality of antenna arrays, receive a second radio signal (e.g., the second radio signal 640 of FIG. 6) that is a reflected signal of the first radio signal and has the specified polarized wave, by using a second antenna array (e.g., the second antenna array 212 of FIG. 2) different from the first antenna array among the plurality of antenna arrays, and identify an external object (e.g., the external object 230 of FIG. 2 and/or the external objects 230-1 and 230-2 of FIG. 6) around the electronic device, based on the second radio signal.

According to an embodiment, the at least one processor may transmit the first radio signal through a first beam directed in a first direction by using the first antenna array, receive the second radio signal by using at least one beam formable within the second antenna array, identify a second beam in which a reception gain of the second radio signal is largest from among the at least one beam, and identify whether the electronic device is located in an indoor environment, based on a second direction corresponding to the second beam.

According to an embodiment, the at least one processor may transmit the first radio signal by using the first antenna array disposed toward a first surface of the electronic device, and receive the second radio signal by using the second antenna array disposed toward a second surface of the electronic device different from the first surface.

According to an embodiment, the at least one processor may, in response to identifying the second beam directed in the second direction different from the first direction, determine that the electronic device is located in the indoor environment.

According to an embodiment, the at least one processor may control the first antenna array within a specified power range less than a specified first power of the first antenna array, to transmit the first radio signal through the first beam directed in the first direction, and receive the second radio signal through the first beam directed in the first direction by using the second antenna array.

According to an embodiment, the at least one processor may transmit the first radio signal by using the first antenna array included in an antenna module included in the electronic device, and receive the second radio signal by using the second antenna array included in the antenna module.

According to an embodiment, the at least one processor may transmit the first radio signal through the first beam directed in the first direction by using the first antenna array, and receive the second radio signal through the second beam directed in the second direction corresponding to the first direction by using the second antenna array.

According to an embodiment, the first antenna array and the second antenna array may be disposed to be spaced a specified distance apart from each other in the electronic device, and in response to identifying the external object, the at least one processor may acquire a distance between the electronic device and the external object, based on at least one of the specified distance, the first direction and the second direction.

According to an embodiment, the electronic device may further include a display, and in response to identifying the external object, the at least one processor may display a user interface being based on the external object in the display.

According to an embodiment, the at least one processor may transmit a third radio signal for communicating with a wireless network by using at least one of the plurality of antenna arrays, and in response to identifying the external object, adjust the third radio signal for communicating with the wireless network.

According to an embodiment, a method of an electronic device may include transmitting a first radio signal having a specified polarized wave by using a first antenna array among a plurality of antenna arrays of the electronic device, receiving a second radio signal which is a reflected signal of the first radio signal and has the specified polarized wave, by using a second antenna array different from the first antenna array among the plurality of antenna arrays, and identifying an external object around the electronic device, based on the second radio signal.

According to an embodiment, the transmitting may include transmitting the first radio signal through a first beam directed in a first direction by using the first antenna array, and the receiving may include receiving the second radio signal by using at least one beam formable within the second antenna array, and identifying a second beam in which a reception gain of the second radio signal is largest from among the at least one beam, and identifying the external object may include identifying whether the electronic device is located in an indoor environment, based on a second direction corresponding to the second beam.

According to an embodiment, the transmitting may include transmitting the first radio signal by using the first antenna array disposed toward a first surface of the electronic device, and the receiving may include receiving the second radio signal by using the second antenna array disposed toward a second surface of the electronic device different from the first surface.

According to an embodiment, identifying whether the electronic device is located in an indoor environment may include, in response identifying the second beam directed in the second direction different from the first direction, determining that the electronic device is located in the indoor environment.

According to an embodiment, the transmitting may include controlling the first antenna array within a specified power range less than a specified first power of the first antenna array, to transmit the first radio signal through a first beam directed in a first direction, and the receiving may include receiving the second radio signal through the first beam directed in the first direction by using the second antenna array.

According to an embodiment, the transmitting may include transmitting the first radio signal by using the first antenna array included an antenna module included in the electronic device, and the receiving may include receiving the second radio signal by using the second antenna array included in the antenna module.

According to an embodiment, the transmitting may include transmitting the first radio signal through the first beam directed in the first direction by using the first antenna array, and the receiving may include receiving the second radio signal through the second beam directed in the second direction corresponding to the first direction by using the second antenna array.

According to an embodiment, the first antenna array and the second antenna array may be disposed to be spaced a specified distance apart from each other in the electronic device, and in response to identifying the external object, the at least one processor may acquire a distance between the electronic device and the external object, based on at least one of the specified distance, the first direction and the second direction.

According to an embodiment, a method further including, in response to identifying the external object, displaying a user interface being based on the external object in a display may be presented.

According to an embodiment, a method further including transmitting a third radio signal for communicating with a wireless network by using at least one of the plurality of antenna arrays, and in response to identifying the external object, adjusting the third radio signal for communicating with the wireless network may be presented.

Methods of embodiments mentioned in the claims or specification of the present disclosure may be implemented in the form of hardware, software, or a combination of hardware and software.

In response to being implemented by software, a computer-readable storage media storing one or more programs (software modules) may be presented. The one or more programs stored in the computer-readable storage media are configured to be executable by one or more processors within an electronic device. The one or more programs include instructions for enabling the electronic device to execute the methods of the embodiments stated in the claims or specification of the present disclosure.

These programs (i.e., software modules and/or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, the programs may be stored in a memory that is constructed in combination of some of them or all. Also, each constructed memory may be included in the plural as well.

Also, the program may be stored in an attachable storage device that may access via a communication network such as Internet, an intranet, a local area network (LAN), a wireless LAN (WLAN) or a storage area network (SAN), or a communication network constructed in combination of them. This storage device may be connected to a device performing an embodiment of the present disclosure via an external port. Also, a separate storage device on the communication network may be connected to the device performing the embodiment of the present disclosure as well.

In the aforementioned concrete embodiments of the present disclosure, a constituent element included in the disclosure has been expressed in a singular form or a plural form according to a provided concrete embodiment. But, the expression of the singular form or plural form is selected suitable to a given situation for description convenience's sake, and the present disclosure is not limited to singular or plural constituent elements. Even if a constituent element is expressed in the plural form, the constituent element may be constructed in the singular form, or even if a constituent element is expressed in the singular form, the constituent element may be constructed in the plural form.

On the other hand, in a detailed description of the present disclosure, a concrete embodiment has been described, but it is undoubted that various modifications are available without departing from the scope of the present disclosure. Therefore, the scope of the present disclosure should not be limited to and defined by the described embodiment and should be defined by not only claims stated later but also equivalents to these claims.

What is claimed is:

1. An electronic device comprising:
   a plurality of antenna arrays for communicating with a first base station installed in an indoor space and a second base station installed in an outdoor space; and
   at least one processor electrically connected to the plurality of antenna arrays; and
   memory storing instructions that, when executed by the at least one processor, cause the electronic device to:
      identify that the electronic device enters the indoor space based on increase of a strength of a first signal received from the first base station, and decrease of a strength of a second signal received from the second base station,
      transmit a first radio signal including a specified polarized wave through a first antenna array among the plurality of antenna arrays,
      in case that a second radio signal that is a reflected signal of the first radio signal and includes the specified polarized wave is received through a second antenna array different from the first antenna array among the plurality of antenna arrays, identify that an external object exists between the electronic device and the first base station, and
      in case that the second radio signal is not received, identify that the external object does not exist between the electronic device and the first base station.

2. The electronic device of claim 1, wherein the instructions, when executed by the at least one processor, cause the electronic device to:
   transmit the first radio signal through a first beam directed in a first direction through the first antenna array;
   receive the second radio signal using at least one beam formable through the second antenna array;
   identify a second beam comprising a largest reception gain of the second radio signal than other radio signals among the at least one beam; and
   determine whether the electronic device is located in the indoor space based on a second direction corresponding to the second beam.

3. The electronic device of claim 1, wherein the instructions, when executed by the at least one processor, cause the electronic device to:
   transmit the first radio signal through the first antenna array disposed toward a first face of the electronic device; and
   receive the second radio signal through the second antenna array disposed toward a second face of the electronic device different from the first face.

4. The electronic device of claim 2, wherein the instructions, when executed by the at least one processor, cause the electronic device to:
   in response to identifying the second beam directed in the second direction different from the first direction, determine that the electronic device is located in the indoor space.

5. The electronic device of claim 1, wherein the instructions, when executed by the at least one processor, cause the electronic device to:
   adjust transmission power of the first radio signal within a specified power range less than a specified first power;
   transmit, through the first antenna array, the first radio signal with the adjusted transmission power through a first beam directed in a first direction; and
   receive the second radio signal through the first beam directed in the first direction using the second antenna array.

6. The electronic device of claim 5, wherein the instructions, when executed by the at least one processor, cause the electronic device to:
   transmit the first radio signal through the first antenna array included in an antenna module of the electronic device; and
   receive the second radio signal through the second antenna array included in the antenna module.

7. The electronic device of claim 1, wherein the instructions, when executed by the at least one processor, cause the electronic device to:
   transmit, through the first antenna array, the first radio signal through a first beam directed in a first direction; and
   receive, through the second antenna array, the second radio signal through a second beam directed in a second direction corresponding to the first direction.

8. The electronic device of claim 7,
wherein the first antenna array and the second antenna array are disposed in a specified distance apart from each other in the electronic device; and
wherein, in response to identifying that the external object exists between the electronic device and the first base station, the at least one processor is further configured to acquire a distance between the electronic device and the external object based on at least one of the specified distance, the first direction, or the second direction.

9. The electronic device of claim 1, further comprising:
a display,
wherein, in response to identifying the external object exists between the electronic device and the first base station, the at least one processor is further configured to display, on the display a user interface based on the external object.

10. The electronic device of claim 1, wherein the instructions, when executed by the at least one processor, cause the electronic device to:
transmit a third radio signal for communicating with a wireless network through at least one of the plurality of antenna arrays; and
in response to identifying that the external object exists between the electronic device and the first base station, adjust at least one of a strength or a beam corresponding to a fourth radio signal for communicating with the wireless network.

11. A method of an electronic device, the method comprising:
identifying that the electronic device enters an indoor space based on increase of a strength of a first signal received from a first base station installed in the indoor space, and decrease of a strength of a second signal received from a second base station installed in an outdoor space;
transmitting a first radio signal including a specified polarized wave through a first antenna array among a plurality of antenna arrays of the electronic device;
in case that a second radio signal that is a reflected signal of the first radio signal and includes the specified polarized wave is received through a second antenna array different from the first antenna array among the plurality of antenna arrays, identifying that an external object exists between the electronic device and the first base station; and
in case that the second radio signal is not received, identifying that the external object does not exist between the electronic device and the first base station.

12. The method of claim 11, further comprising:
transmitting the first radio signal through a first beam directed in a first direction through the first antenna array;
receiving the second radio signal using at least one beam formable through the second antenna array;
identifying a second beam comprising a largest reception gain of the second radio signal that other radio signals among the at least one beam; and
determining whether the electronic device is located in the indoor space based on a second direction corresponding to the second beam.

13. The method of claim 11, further comprising:
transmitting the first radio signal through the first antenna array disposed toward a first face of the electronic device; and
receiving the second radio signal through the second antenna array disposed toward a second face of the electronic device different from the first face.

14. The method of claim 12, further comprising:
in response to identifying the second beam directed in the second direction different from the first direction, determining that the electronic device is located in the indoor space.

15. The method of claim 11, further comprising:
adjusting transmission power of the first radio signal within a specified power range less than a specified first power;
transmitting, through the first antenna array, the first radio signal with the adjusted transmission power through a first beam directed in a first direction; and
receiving the second radio signal through the first beam directed in the first direction using the second antenna array.

16. The method of claim 15, further comprising:
transmitting the first radio signal through the first antenna array included in an antenna module of the electronic device; and
receiving the second radio signal through the second antenna array included in the antenna module.

17. The method of claim 11, further comprising:
transmitting, through the first antenna array, the first radio signal through a first beam directed in a first direction; and
receiving, through the second antenna array, the second radio signal through a second beam directed in a second direction corresponding to the first direction.

18. The method of claim 17, further comprising:
in response to identifying that the external object exists between the electronic device and the first base station, acquiring a distance between the electronic device and the external object based on at least one of a specified distance, the first direction, or the second direction,
wherein the first antenna array and the second antenna array are disposed in the specified distance apart from each other in the electronic device.

19. The method of claim 11, further comprising:
in response to identifying that the external object exists between the electronic device and the first base station, displaying, on a display, a user interface based on the external object.

20. The method of claim 11, further comprising:
transmitting a third radio signal for communicating with a wireless network through at least one of the plurality of antenna arrays; and
in response to identifying that the external object exists between the electronic device and the first base station, adjusting at least one of a strength or a beam corresponding to a fourth radio signal for communicating with the wireless network.

* * * * *